US008165771B2

(12) United States Patent
Doi

(10) Patent No.: US 8,165,771 B2
(45) Date of Patent: Apr. 24, 2012

(54) VEHICLE

(75) Inventor: Katsunori Doi, Tokyo (JP)

(73) Assignee: Kabushikikaisha Equos Research (JP)

( * ) Notice: Subject to any disclaimer, the term of this patent is extended or adjusted under 35 U.S.C. 154(b) by 328 days.

(21) Appl. No.: 12/439,127

(22) PCT Filed: Aug. 31, 2007

(86) PCT No.: PCT/JP2007/067001
§ 371 (c)(1),
(2), (4) Date: Feb. 24, 2010

(87) PCT Pub. No.: WO2008/026725
PCT Pub. Date: Mar. 6, 2008

(65) Prior Publication Data
US 2010/0145576 A1    Jun. 10, 2010

(30) Foreign Application Priority Data

Aug. 31, 2006 (JP) .................. 2006-234755
Aug. 31, 2006 (JP) .................. 2006-234756
Aug. 31, 2006 (JP) .................. 2006-234757
Aug. 31, 2006 (JP) .................. 2006-234758

(51) Int. Cl.
*G06G 1/00* (2006.01)

(52) U.S. Cl. ........................................ 701/72

(58) Field of Classification Search .............. 701/41, 701/70, 79, 90, 93, 72
See application file for complete search history.

(56) References Cited

U.S. PATENT DOCUMENTS

2005/0121238 A1    6/2005  Ishii .................... 180/65.1
2005/0216162 A1 *  9/2005  Suzuki et al. ............. 701/70

FOREIGN PATENT DOCUMENTS

| JP | 2004-129435 | 4/2004 |
| JP | 2004-276727 | 10/2004 |
| JP | 2004-345608 | 12/2004 |
| JP | 2005-075070 | 3/2005 |

* cited by examiner

*Primary Examiner* — Kim T Nguyen
(74) *Attorney, Agent, or Firm* — Bacon and Thomas, PLLC

(57) ABSTRACT

The center of gravity of a vehicle is estimated to obtain, a limit lateral acceleration $a_{lim}$ (=$a_{Min}$, $a_{Max}$), and the vehicle turns in a target running state ($V^*$, $\gamma^*$) requested by an occupant provided the lateral acceleration $a^*$ does not exceed the limit lateral acceleration $a_{lim}$. On the other hand, if the requested running state ($V^*$, $\gamma^*$) exceeds the limit lateral acceleration $a_{aim}$, an ideal target running state ($V^*$, $\gamma^*$) is limited to an actual target running state ($V^*\sim$, $\gamma^*\sim$) so that the lateral acceleration $a^*$ equals to the limit lateral acceleration $a_{aim}$. Because turning speed and turning curvature are not limited more than necessary, it is possible to achieve maximum use of turning performance of the vehicle up to the limit thereof.

18 Claims, 14 Drawing Sheets

F I G . 1
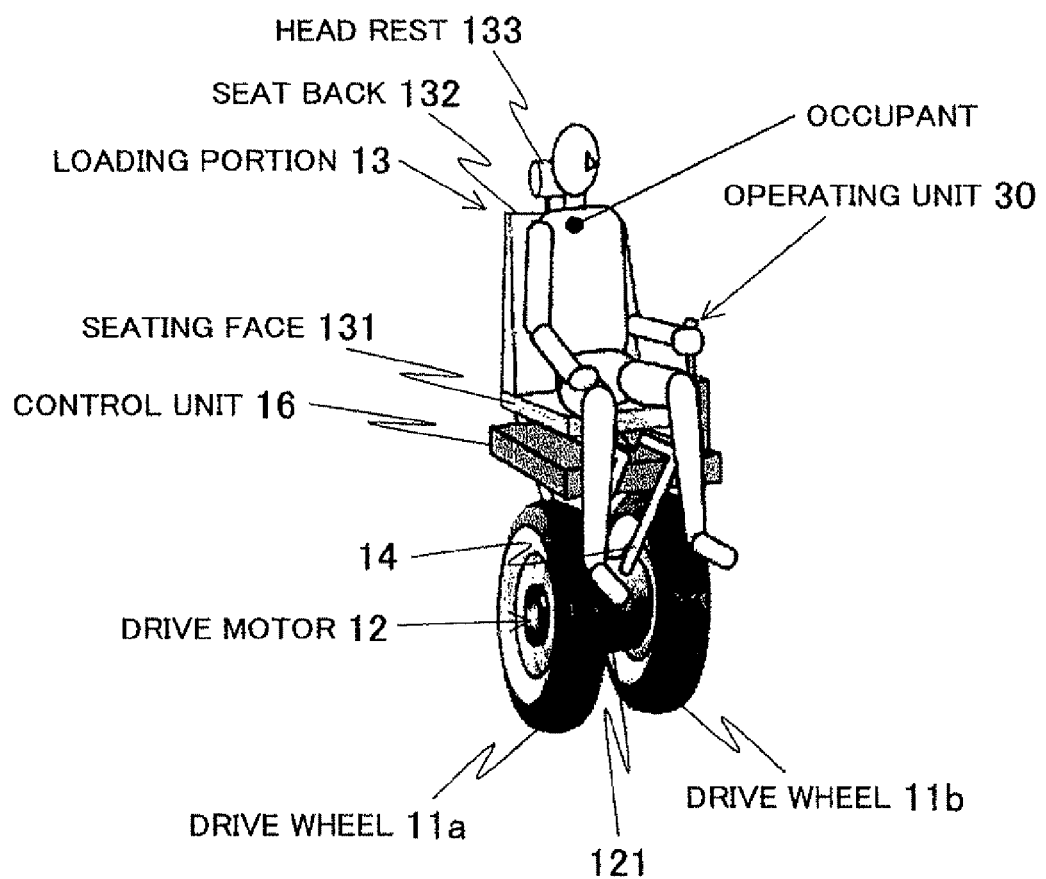

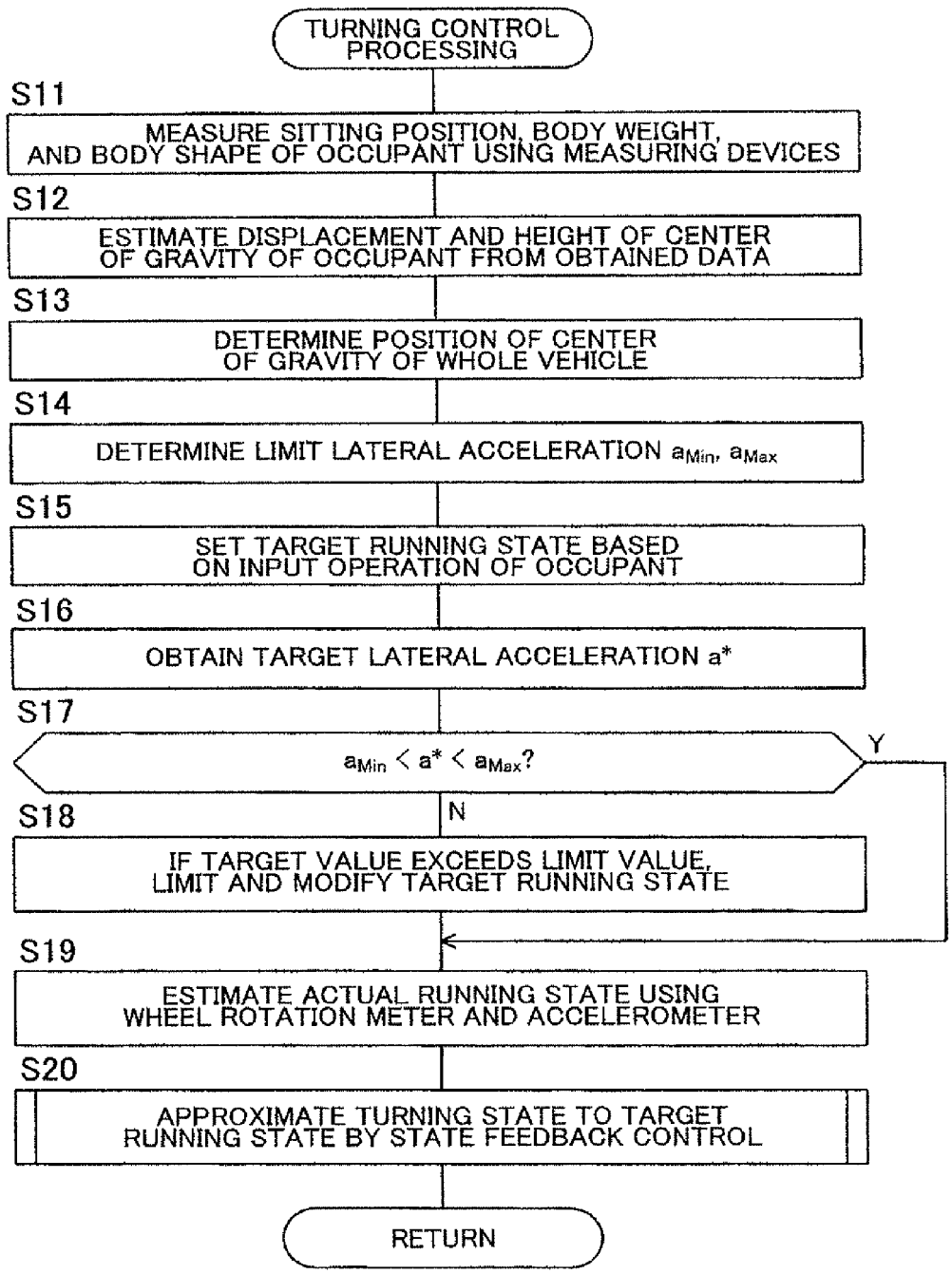

BASIC CENTER POINT S OF GROUND CONTACT LOAD

F I G . 14
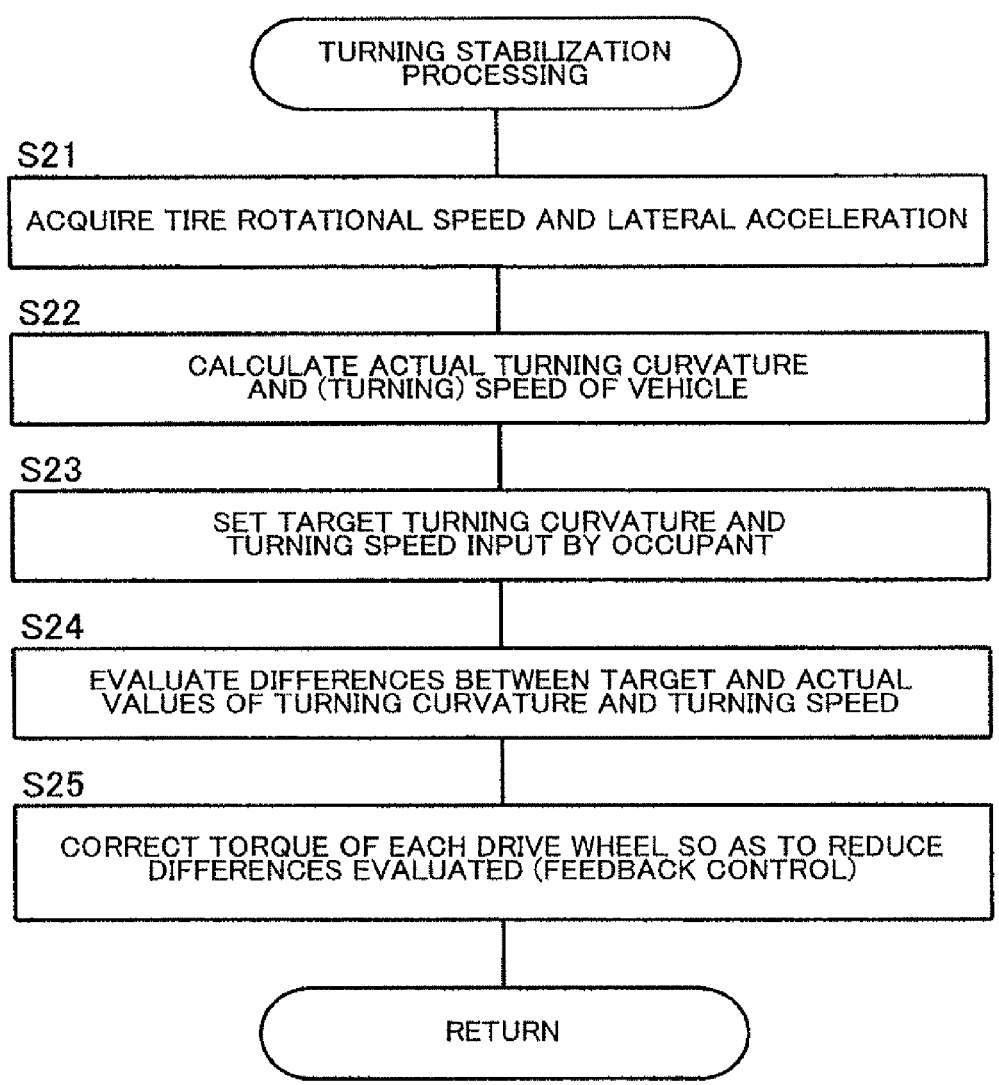

FIG. 15
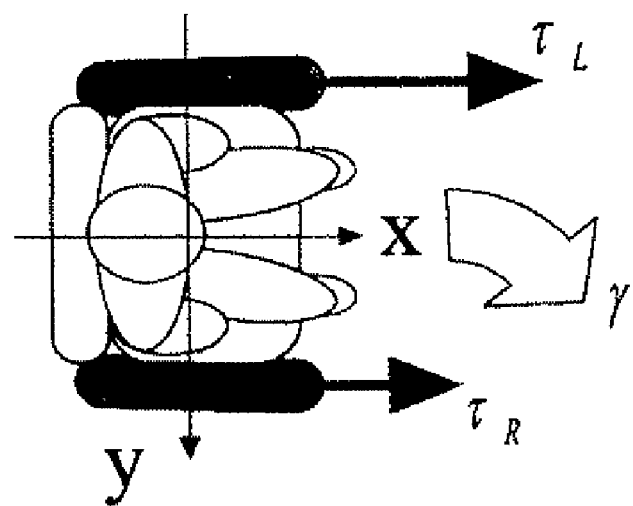
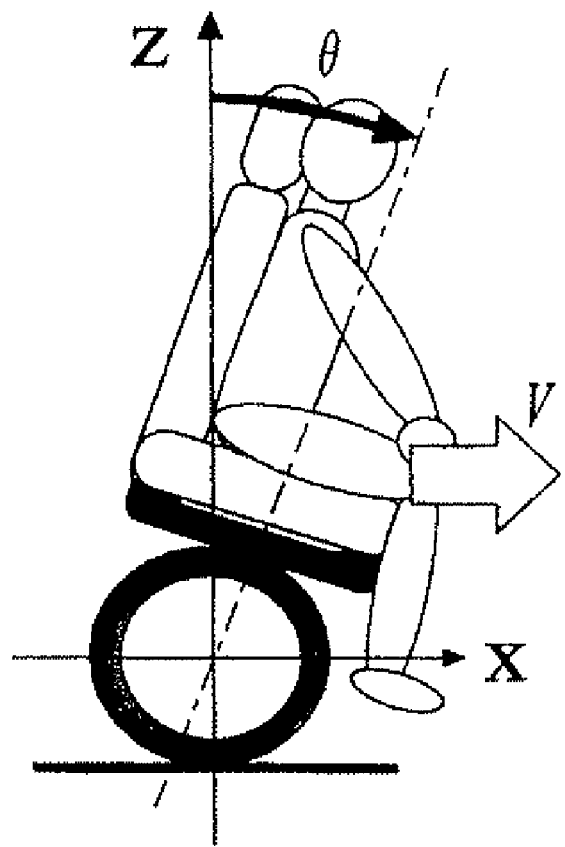

VEHICLE

TECHNICAL FIELD

The present invention relates to a vehicle, and for example, to control of turning of a vehicle with two horizontally-oriented wheels that has two drive wheels arranged in a manner facing each other.

BACKGROUND ART

A vehicle using attitude control of an inverted pendulum (hereinafter simply called "inverted pendulum vehicle") has been gathering attention and is currently being put into practice.

For example, Patent Document 1 proposes a technology in which two drive wheels are coaxially arranged to perform driving by detecting the attitude of the drive wheels affected by a movement of the center of gravity of a driver.

In addition, there are proposed a vehicle that moves while controlling the attitude of one conventional circular drive wheel or one spherical drive wheel, and also various types of inverted pendulum vehicles.

[Patent Document 1] Japanese Patent Application Publication No. JP-A-2004-276727

[Patent Document 2] Japanese Patent Application Publication No. JP-A-2004-129435

The vehicle as described above maintains a stationary state thereof or runs while controlling the attitude of itself based on the body weight transfer due to movement of the driver, on the amount of operation transmitted from a remote controller or an operating unit, on the drive command data entered in advance, or on the like.

Then, the vehicle makes a turn by steering the wheels or by providing a differential torque between the two wheels.

DISCLOSURE OF THE INVENTION

Problem to be Solved by the Invention

However, compared with general passenger vehicles, the vehicle for one person as described above has a small size and a narrow space between right and left wheels. In addition, since the ratio of weight of an occupant to the weight of the whole vehicle is large, the position of center of gravity of the whole vehicle results to be high when ensuring the sitting attitude of the occupant.

Consequently, when such a vehicle makes a turn, if the turning speed thereof is too high or the turning radius thereof is too small, there is a possibility that the vehicle can no longer maintain the inverted pendulum control due to a centrifugal force. In addition, because the ground contact load on the inner wheel side becomes small, the inner wheel can slip.

Because there is a limit in turning performance as just described, the vehicle sets limiting values depending on the limit value of the turning performance, and makes a turn within the range of the limiting values.

However, when the sitting position or sitting attitude of the occupant is changed or when a person of a different body shape boards on the vehicle, the limit values of the turning speed and the turning curvature (reciprocal of the turning radius) also change. Consequently, when safety is taken into consideration, it has been necessary to set the limiting values corresponding to the severest condition within the scope of assumed change in conditions, thus making it impossible to set high limiting values suited to each condition.

Moreover, a similar problem also exists in the case in which there is no loaded article or in the case in which the vehicle is automatically driven with any luggage loaded.

Then, if a turning request exceeding the limit of the turning performance is given by an operation of the occupant, it is necessary to limit the turning radius to a large value or to limit the turning speed to a small value relative to the requested value, in order to make a turn within the range of the limiting values that have been set.

However, if the turning radius is suddenly limited, the vehicle can be greatly deviated from the target traveling route of the occupant.

On the other hand, if the turning speed is suddenly limited, a sudden braking occurs, causing a following vehicle to rapidly approach and the occupant to feel uncomfortable.

Therefore, it is a first object of the present invention to obtain a requested turning target and an actual turning limit, and then perform turning with smaller limiting quantities (in a state as near as possible to the turning target) corresponding to the turning limit.

In addition, it is a second object of the present invention to limit a turning speed and a turning radius more suitably for a running intention and a running state within the range of the limiting values that have been set.

Means for Solving the Problem (1) In the invention according to claim 1, the first object is achieved by providing a vehicle including two drive wheels arranged in a manner facing each other with target running state acquiring means that acquires a target speed V* and a target curvature γ*, with running control means that controls running with the target speed V* and the target curvature γ* that have been acquired, with center-of-gravity position acquiring means that acquires a position of center of gravity of the vehicle including a loaded article, with limit lateral acceleration determination means that determines a limit lateral acceleration $a_{lim}$ corresponding to the position of center of gravity acquired, and with limiting means that limits at least one of the target speed V* and the target curvature γ* that have been acquired so that a target lateral acceleration a* corresponding to the target speed V* and the target curvature γ* that have been acquired is made equal to or less than the limit lateral acceleration $a_{lim}$, in the case that the target lateral acceleration a* exceeds the limit lateral acceleration $a_{lim}$.

(2) In the invention according to claim 2, the vehicle according to claim 1, characterized in that the limiting means performs the limitation to values that have the smallest differences from the target speed V* and the target curvature γ* that have been acquired.

(3) In the invention according to claim 3, the vehicle according to claim 1, characterized in that the limiting means limits at least one having a smaller temporal rate of change than the other of the target speed V* and the target curvature γ* that have been acquired.

(4) In the invention according to claim 4, the vehicle according to claim 1, 2, or 3, characterized in that the limiting means performs the limitation to values that have the smallest differences from the target speed V* and the target curvature γ* that have been acquired in the case that both of temporal rates of change in the target speed V* and the target curvature γ* that have been acquired are predetermined threshold values or less, or limits at least one having a smaller temporal rate of change than the other of the target speed V* and the target curvature γ* that have been acquired in the case that at least one of the temporal rates of change in the target speed V* and the target curvature γ* that have been acquired is more than the predetermined threshold value.

(5) In the invention according to claim 5, the vehicle according to claim 1, characterized in that the limiting means limits at least one of the target speed V* and the target curvature γ* that have been acquired so that a position of the vehicle after running at the values after limitation for a predetermined time t is nearest to a position of the vehicle after running at the target speed V* and the target curvature γ* that have been acquired for the predetermined time t.

(6) In the invention according to claim 6, the vehicle according to claim 5, characterized in that the predetermined time t is a length of time that the vehicle takes in the case of turning by a predetermined angle at the target speed V* and the target curvature γ* that have been acquired.

(7) In the invention according to claim 7, the vehicle according to claim 1, characterized in that the limiting means limits at least one of the target speed V* and the target curvature γ* that have been acquired so that an amount of deviation between a running path in the ease of turning at the target speed V* and the target curvature γ* that have been acquired and a running path in the case of turning at the values after limitation is within a predetermined deviation upper limit $\delta_{Max}$.

(8) In the invention according to claim 8, the vehicle according to claim 7, characterized in that the limiting means sets a deceleration b either to a minimum deceleration $b_{Min}$, if an amount of deviation between the vehicle path in the case of turning at the target speed V* and the target curvature γ* that have been acquired and a vehicle path in the case of turning while decelerating at the minimum deceleration $b_{Min}$ until the vehicle is capable of turning at the target curvature γ* that has been acquired is within the predetermined deviation upper limit $\delta_{Max}$, or to a value that makes the amount of deviation coincide with the deviation upper limit $\delta_{Max}$ if the amount of deviation is larger than the predetermined deviation upper limit $\delta_{Max}$, and then limits the target speed V* with the deceleration b and the target curvature γ* with the limited value of the target speed V*.

(9) In the invention according to claim 9, the vehicle according to any one of claims 1 to 8, characterized in that the limiting means limits at least one of the target speed V* and the target curvature γ* that have been acquired so that the target lateral acceleration a* is equal to the limit lateral acceleration $a_{lim}$.

(10) In the invention according to claim 10, the vehicle according to any one of claims 1 to 9, characterized by further comprising:
a load sensor installed at the loading portion;
a height sensor that measures a height of the weight body; and
loaded article center-of-gravity acquiring means that acquires a position of center of gravity of the loaded article based on detection values of the load sensor and the height sensor, wherein
the center-of-gravity position acquiring means acquires the position of center of gravity of the vehicle including the loaded article based on the position of center of gravity of the loaded article acquired and a predefined position of center of gravity of the vehicle.

(11) In the invention according to claim 11, the vehicle according to any one of claims 1 to 10, characterized in that the running control means controls running by feedback control by controlling the target speed V* and the target curvature γ* as direct controlled objects.

Effects of the Invention

The invention according to claim 1 is structured in such a manner that at least one of the target speed V* and the target curvature γ* that have been acquired is limited so that the target lateral acceleration a* is made equal to or less than the limit lateral acceleration $a_{lim}$, in the case that the target lateral acceleration a* exceeds the limit lateral acceleration $a_{lim}$. Therefore, it is made possible to perform turning with required minimum limiting quantities.

The invention according to claim 2 is structured in such a manner that at least one of the target speed V* and the target curvature γ* is limited to a value that has the smallest difference from the target speed V* or the target curvature γ* that has been acquired. Therefore, it is possible to perform the limitation more suitably for a running intention and a running state.

BRIEF DESCRIPTION OF THE DRAWINGS

FIG. 1 is an external configuration diagram of a vehicle according to an embodiment of the present invention.

FIG. 4 is a flow chart showing contents of turning control processing.

FIG. 14 is a flow chart of turning stabilization processing.

FIG. 15 is an explanatory diagram showing states of translation control and attitude control during turning.

Figure 2:
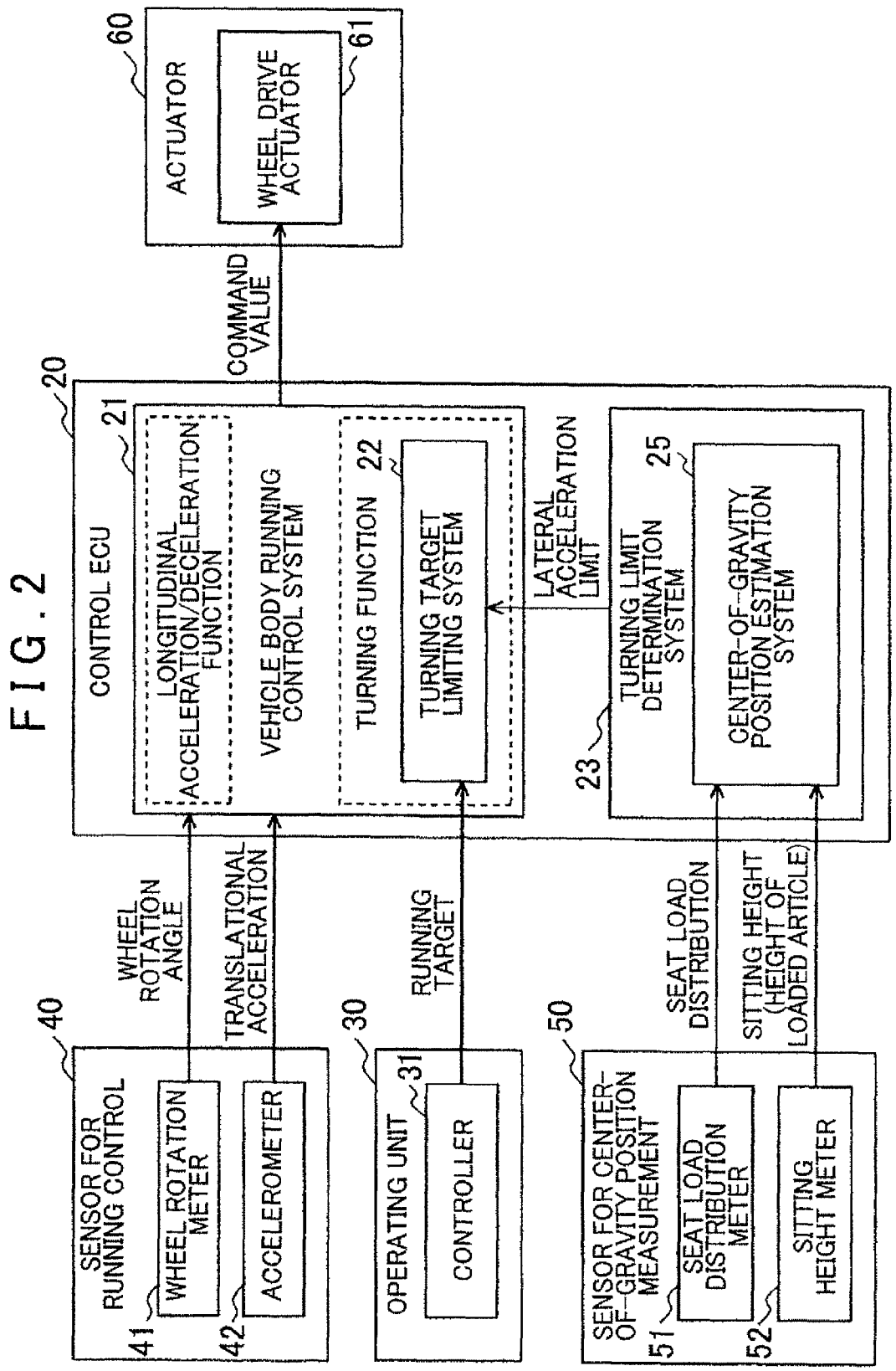
FIG. 2 is a block diagram of a control unit.

DESCRIPTION OF THE REFERENCE NUMERALS 11 drive wheels
12 drive motor
13 loading portion
131 seating face
14 support member
16 control unit
20 control ECU
21 vehicle body running control system
22 turning target limiting system
23 turning limit determination system
25 center-of-gravity position estimation system
30 operating unit
31 controller
40 sensor for running and attitude control
41 traveling speed meter
42 accelerometer
50 sensor for center-of-gravity position measurement 51 load meter
52 sitting height meter
60 actuator
61 drive wheel actuator

BEST MODES FOR CARRYING OUT THE INVENTION

A preferred embodiment of a vehicle according to the present invention will be described below in detail with reference to FIGS. 1 to 15.

(1) Outline of Embodiment

If a center point of ground contact load of a vehicle moves outside of a space between both drive wheels during turning, the vehicle rolls over.

Here, the center point of ground contact load represents an intersection point between the ground surface and a straight line that is parallel to a resultant force vector F of a centrifugal force and a gravitational force acting on the vehicle and also passes through the center of gravity. At this time, the direction of the resultant force vector F is determined by a lateral acceleration of the vehicle, and the lateral acceleration is determined by a turning speed and a turning curvature of the vehicle.

Consequently, a limit of turning performance, that is, a limit position of the center point of ground contact load is determined by the position of center of gravity of the vehicle and the lateral acceleration (turning speed and turning curvature).

In the present embodiment, as turning control for a vehicle with two horizontally-oriented wheels, (a) a limit lateral acceleration is determined as a turning limit value corresponding to the position of center of gravity of the vehicle, and (b) a turning target is limited if a target lateral acceleration obtained from a turning request by an occupant exceeds the limit lateral acceleration that has been set.

(a) Determination of Limit Lateral Acceleration (Limit Value of Lateral Acceleration)

A position of center of gravity of a loaded article (such as occupant and luggage) is estimated, and, based on this position and a position of a designed center of gravity of the vehicle that is known in the design stage, a position of center of gravity of a whole vehicle is estimated.

Then, a value of the limit lateral acceleration $a_{lim}$ is obtained from the estimated position of center of gravity of the whole vehicle and design values of the vehicle (such as a distance between both drive wheels 11$a$ and 11$b$). This limit lateral acceleration $a_{lim}$ can be obtained independently of a running state including vehicle speed.

Note that to estimate the position of the center of gravity, a sitting position, weight, and body shape of the loaded article (such as occupant and luggage) are measured based on measured values of a load meter and a sitting height meter, and the position of center of gravity of the vehicle (displacement from a plane of symmetry of a vehicle body, and height) is estimated from those measured values.

(b) Limitation of Turning Target

For example, if the target lateral acceleration a* based on a target running state given as an input by the occupant is 0.5 G that exceeds an obtained value of the limit lateral acceleration $a_{lim}$=0.3 G, the target running state needs to be limited so that a lateral acceleration a=$a_{lim}$=0.3 G because it is impossible to perform control as the occupant requests.

In the present embodiment, as a limitation of the turning target, the turning is performed using values of the vehicle speed and the turning curvature that are limited by one of the following methods.

Note that the turning is performed according to the input value if the target running state given as the input represents the limit lateral acceleration $a_{lim}$ or less.

(a) Optimization with Respect to Target (First Optimization)

In a first optimization, optimization is performed with respect to an input target (V*, γ*) of the occupant so that the difference between an ideal target state (target running state given as an input by occupant or externally given as a command) and an actual target state (target running state limited so that the lateral acceleration does not exceed a limit value) is minimized.

(b) Optimization in View of Target Change (Second Optimization)

In a second optimization, the temporal change (temporal rate of change) in an ideal target R (V*, γ*) is taken into account to determine an actual target G (c) Optimization with Respect to Target in View of Operating Intention of Occupant (Third Optimization)

In a third optimization, optimization is performed by taking into account the input target (V*, γ*) of the occupant and the change thereof. In an operation of a joystick (controller 31) by the occupant, the degree of occupant's intension (for example, urgency of the request) can be judged by the speed of movement of the joystick. Therefore, the temporal rate of change in the input target (V*, γ*) is obtained, and if the quantity thereof is a predetermined threshold value Th (Thv, Thγ) or less, the first optimization is performed based on the judgment that there is no urgency; or, if the quantity is more than the threshold value Th, the second optimization is performed based on the judgment that there is an urgency.

(d) Optimization of Running Position (Fourth Optimization)

In a fourth optimization, optimization is performed so that the distance between an ideal target position P1 and an actual target position P2 after a certain time t is minimized.

(e) Constraint of Running Start Deviation (Fifth Optimization)

In a fifth optimization, optimization is performed from the viewpoint of running path deviation.

That is, a deceleration b for decelerating the vehicle is obtained so that the deviation between an ideal target path and an actual target path falls within a defined limiting value, and optimization is performed based on the value.

(2) Details of Embodiment

FIG. 1 illustrates an example of an external configuration of the vehicle according to the present embodiment.

As shown in FIG. 1, the vehicle is equipped with two coaxially arranged drive wheels 11$a$ and 11$b$.

Both of the drive wheels 11$a$ and 11$b$ are driven by a drive motor 12.

A loading portion 13 (seat) to be loaded with the luggage or the occupant serving as a weight body is arranged on the upper side of the drive wheels 11$a$ and 11$b$ (both the drive wheels 11$a$ and 11$b$ will be referred to as drive wheels 11, hereinafter) and the drive motor 12.

The loading portion 13 is composed of a seating face 131 on which a driver is seated, a seat back 132, and a headrest 133.

The loading portion 13 is supported by a support member 14 fixed to a drive motor housing 121 in which the drive motor 12 is included.

An operating unit 30 is arranged on the left side of the loading portion 13. The operating unit 30 is operated by the driver to command operations such as acceleration, deceleration, turning, spinning around itself, stop, and braking of the vehicle.

Although the operating unit 30 in the present embodiment is fixed to the seating face 131, the operating unit 30 may be formed with a remote controller through wired or wireless connection. Alternatively, an armrest may be provided to be installed with the operating unit 30 on the upper side thereof.

In addition, whereas the vehicle of the present embodiment is installed with the operating unit 30, a running command data acquiring unit is provided instead of the operating unit 30 in the case of a vehicle automatically driven according to predetermined running command data. The running command data acquiring unit may be composed of, for example, a reading unit for reading the running command data from various storage media such as semiconductor memory and/or a communication control unit for acquiring the running command data from outside through wireless communication.

Note that FIG. 1 shows a case in which the loading portion 13 is loaded with a person. However, the present invention is not necessarily limited to the case of a vehicle driven by a person. There may be a case in which the vehicle loaded only with luggage is driven and stopped by remote control from outside, a case in which the vehicle loaded only with luggage is driven and stopped according to the running command data, or even a case in which the vehicle is driven and stopped in an unloaded state.

In the present embodiment, the acceleration, deceleration, and the like are controlled based on operation signals output by operating the operating unit 30. However, as shown, for example, in Patent Document 1, attitude control and running control of the vehicle may be performed in response to a longitudinal tilt angle of the driver relative to the vehicle, based on the change in forward tilting moment or the longitudinal tilt angle by the driver. In addition, both of the systems may be switchable between each other.

The lower side of the loading portion 13 (backside of the seating face 131) is installed with a load meter 51 that is not shown but to be described later.

In addition, the rear surface of the loading portion (outer surface of the seat back) is installed with a sitting height meter 52 that is not shown but to be described later.

A control unit 16 is arranged between the loading portion 13 and the drive wheels 11.

In the present embodiment, although the control unit 16 is installed on the lower surface of the seating face 131 of the loading portion 13, the control unit 16 may be installed on the support member 14.

FIG. 2 shows a configuration of the control unit 16.

The control unit 16 is provided with a control ECU (electronic control unit) 20 that performs various kinds of control such as the vehicle running and attitude control and the running control during turning in the present embodiment. The operating unit 30, a sensor 40 for running control, a sensor 50 for center-of-gravity position measurement, an actuator 60, and other devices such as a battery are electrically connected to the control ECU 20.

The battery supplies power to the drive motor 12, the actuator 60, the control ECU 20, and so forth.

The control ECU 20 is composed of a computer system provided with a

ROM including data and various programs such as a running control program, an attitude control program, and a turning control processing program in the present embodiment, a RAM for use as a work area, external storage devices, interfaces, and others.

The control ECU 20 is provided with a vehicle body running control system 21 and a turning limit determination system 23.

The vehicle body running control system 21 is configured so as to achieve a longitudinal acceleration/deceleration function for controlling acceleration and deceleration in the longitudinal direction of the vehicle, and a turning function for turning the vehicle, and provided with a turning target limiting system 22 for achieving the turning function.

The vehicle body running control system 21 performs the attitude control based on a running target given as an input from the controller 31, and on wheel rotation angles of the both drive wheels 11a, 11b and/or a translational acceleration that are supplied from the sensor 44 for running control.

In addition, depending on commands for longitudinal acceleration/deceleration and turning supplied from the operating unit 30, the vehicle body running control system 21 supplies an output command value for achieving the commands to a wheel drive actuator 61.

In the present embodiment, the turning is performed by controlling the rotational speeds of the both drive wheels 11a and 11b.

The turning target limiting system 22 limits the turning target (target values of the vehicle speed and the turning curvature) provided from the controller 31, based on the lateral acceleration limit determined by the turning limit determination system 23.

The turning limit determination system 23 is provided with a center-of-gravity position estimation system 25.

The center-of-gravity position estimation system 25 determines the type of the loaded article (person, luggage, or nothing) based on a supplied lateral acceleration and measured values of load distribution and sitting height, and estimates the displacement and the height of center of gravity of the loaded article depending on the type thereof.

The center-of-gravity position estimation system 25 also determines the position of center of gravity of the vehicle based on the displacement of center of gravity and the height that have been estimated.

The turning limit determination system 23 obtains the limit lateral acceleration from the estimated position of center of gravity of the vehicle, and supplies the limit lateral acceleration to the turning target limiting system 22.

The operating unit 30 is equipped with the controller 31, and supplies the target values of the vehicle running to the control ECU 20 based on the operation of the driver.

The controller 31 is provided with the joystick. The joystick is in the neutral position when it is upright, commanding a forward or reverse movement when inclined in the forward or rearward direction, and a rightward or leftward turn when inclined in the rightward or leftward direction. The required speed or turning curvature increases with the inclination angle.

The sensor 40 for running control is provided with a wheel rotation meter 41 for detecting the wheel rotation angles and an accelerometer 42 for detecting the translational acceleration of the vehicle.

The detection values by the sensor 40 for running control are supplied to the vehicle body running control system 21.

The sensor 50 for center-of-gravity position measurement is provided with the load meter (or load distribution meter) and the sitting height meter (or shape measuring device) that are used for estimating (directly estimating) the position of center of gravity of the occupant (loaded article).

FIG. 3 shows an arrangement of the load meter 51 and the sitting height meter 52.

As shown in FIG. 3, the load meter 51 is arranged on the lower side of the loading portion 13, specifically, on the lower surface of the seating face 131.

The load meter 51 measures the load distribution (eccentricity) on the seat, and supplies the measured values to the center-of-gravity position estimation system 25.

The load meter 51 is arranged on the lower side of the loading portion 13 (on the side lower than the seat structure) so as to be configured to be capable of measuring not only the load arranged on the loading portion but also loads of all loaded articles such as a load hung on the seat back 132 or the headrest 133 and loads arranged in other places.

Note that the load meter 51 is not intended to measure the weight of the vehicle body (hereinafter called vehicle body weight) and the position of the center of gravity thereof (hereinafter called vehicle body center-of-gravity position) because they are fixed and predetermined in the design stage.

In the present embodiment, three or more load meters that can measure three axial components are arranged as the load meter 51.

The load meter 51 measures a weight concurrently with the load distribution, and uses the weight for discriminating the loaded article and for setting a target position (angle) of a center-of-gravity position adjustment system.

Although two laterally arranged load meters are sufficient for estimating the position of center of gravity of the loaded article, a fail-safe is achieved by installing the three or more load meters (measurement is possible even if one load meter is broken).

Moreover, in addition to using the load meters that can measure three axial components, data of the lateral acceleration and a lateral vehicle body inclination angle may be used so as to enable estimation of the displacement of center of gravity during turning or when the vehicle body is inclined.

As shown in FIG. 3, the sitting height meter 52 is provided on the seat back 132 and the headrest 133.

The sitting height meter 52 measures the height of the loaded article (sitting height of upper part) by scanning a movable type (scanning type) optical sensor in the vertical direction (in the direction of height). Hereby, a high-accuracy measurement is made possible. The measured values are supplied to the center-of-gravity position estimation system 25.

Note that a plurality of fixed type sensors may be arranged in the vertical direction to discretely measure the height of the loaded article.

Note that, in the sitting height meter 52 of the present embodiment, a plurality of the optical sensors are arranged in the horizontal direction so as to be capable of measuring the height even if the loaded article is laterally displaced by a large amount and also to achieve a fail-safe in the case of failure of one of the optical sensors by using the measured values of the other optical sensors.

Moreover, by using the sitting height meter 52 of the present invention, it is also possible to estimate the shape of the loaded article to be used for determination of the type thereof (person, luggage, or nothing).

Note that any other measuring device may be used as an alternative as far as information on the position of center of gravity is obtained.

Figure 3A:
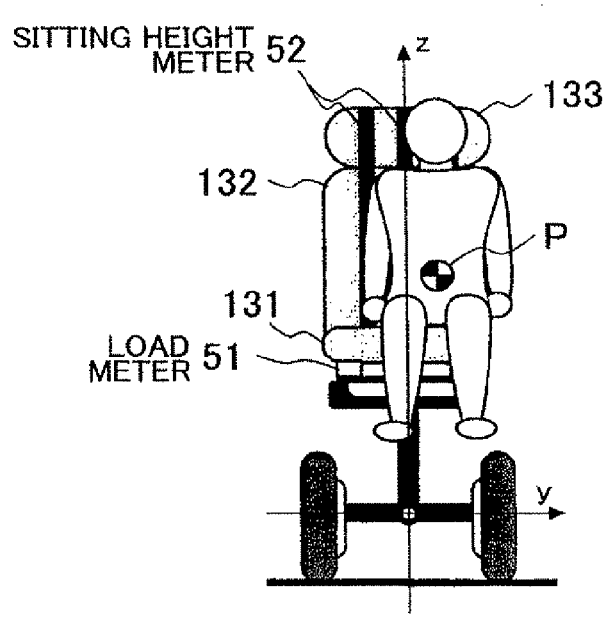
FIG. 3 shows explanatory arrangement diagrams of a load meter and a sitting height meter.
Figure 3B:
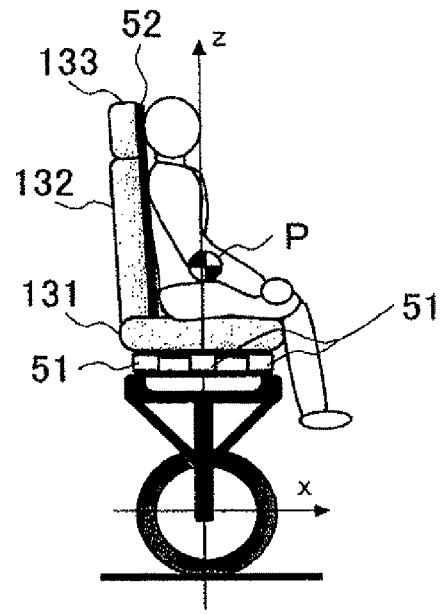
Figure 3C:
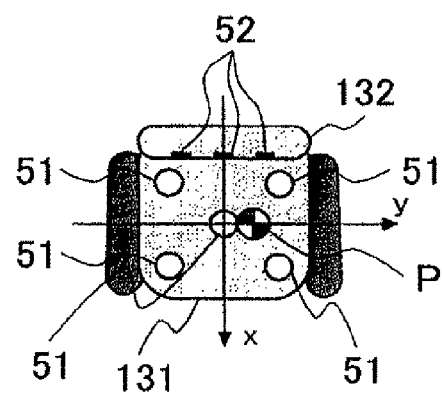
Figure 3D:
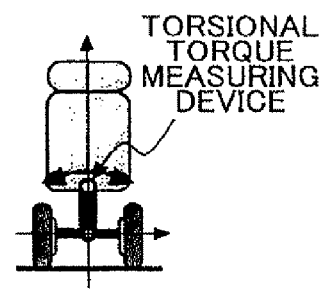

For example, as shown in FIG. 3D, the displacement of center of gravity can be measured with a torsional torque measuring device. However, in this case, it is necessary to install one load meter to measure the mass of the loaded article.

In FIG. 2, the actuator 60 is provided with the vehicle body drive actuator 61 that drives the drive wheels 11 according to a command value supplied from the vehicle body running control system 21.

The vehicle body drive actuator 61 independently applies drive control to each of the both drive wheels 11a and 11b according to the command value.

Next, description will be made of turning control processing in the vehicle as the embodiment configured as described above.

FIG. 4 is a flow chart showing contents of the turning control processing.

The turning limit determination system 23 of the control ECU 20 measures the loading (sitting) position, the load (body weight), and the shape (body shape) of the loaded article (such as occupant) by using measuring devices such as the sensor 50 for center-of-gravity position measurement (step 11).

Subsequently, the center-of-gravity position estimation system 25 of the turning limit determination system 23 estimates the displacement and the height of center of gravity of the loaded article from the obtained data (step 12).

First, the center-of-gravity position estimation system 25 obtains the mass of the loaded article, based on the load on the loading portion 13 obtained from the load meter 51.

Figure 5:
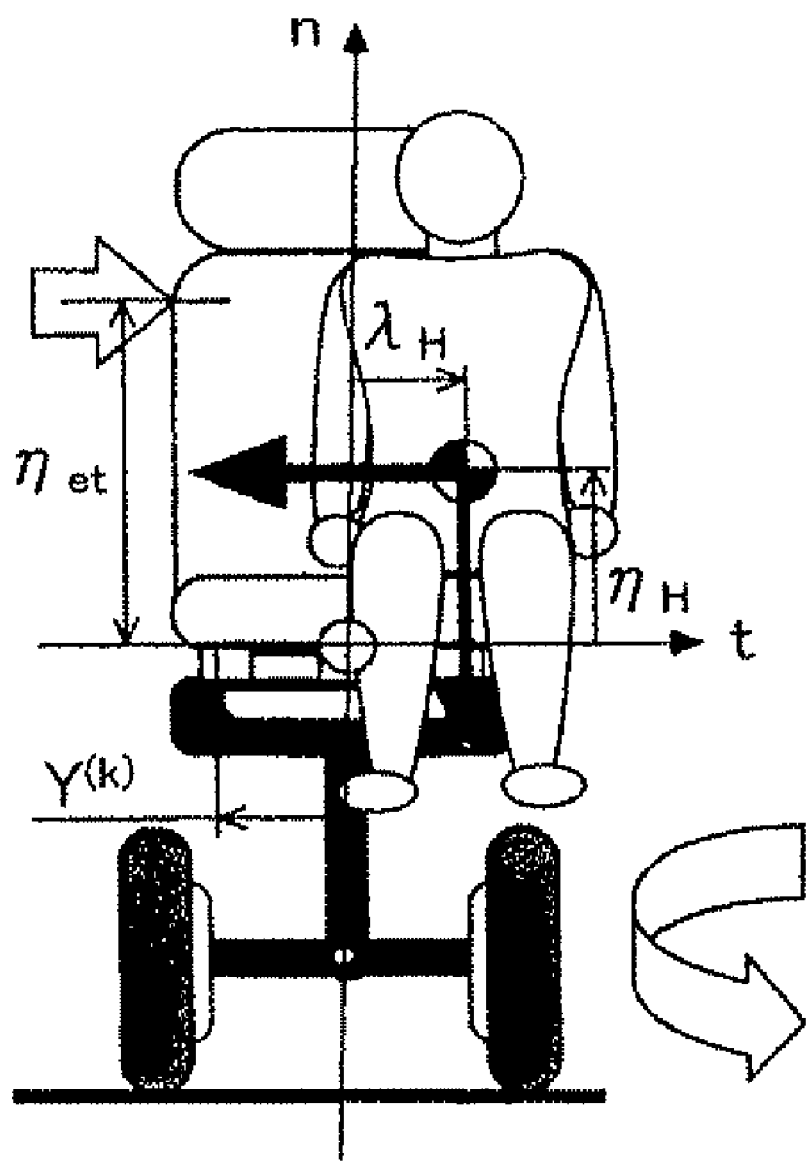
FIG. 5 is an explanatory diagram showing a state of an occupant (loaded article) during turning.

FIG. 5 shows a mechanical state of the occupant (loaded article) and the seat (loading portion 13) during turning.

Denoting the mass of loaded article as $m_H$, the mass of seat as $m_S$, the total mass of loading portion as $m_c = m_H + m_S$, and the acceleration of gravity as g in FIG. 5, the equilibrium of vertical components (components in the direction parallel to the central axis of vehicle body) of forces acting on the loading portion is expressed by the following formula 1.

$$F_n = \Sigma F_n^{(k)} = -m_c g \qquad \text{(Formula 1)}$$

In the formula 1, $F_n^{(k)}$ represents a tensile load measured by the k-th of the N load meters, and a vertical force $F_n$ acting on the loading portion is obtained by summing up the measured values of all of the N load meters.

In the present embodiment, the center-of-gravity position estimation system 25 obtains the mass of loaded article $m_H$ from the following formula 2 obtained by transforming the formula 1.

$$m_H = (F_n/g) - m_S \qquad \text{(Formula 2)}$$

The value of the mass of loaded article $m_H$ is used for evaluation of the position of center of gravity of the whole vehicle and for type determination of the loaded article.

Next, the center-of-gravity position estimation system 25 determines the type of the loaded article (person, luggage, or nothing) based on the height of the loaded article (sitting height, height of luggage) obtained from the sitting height meter and on the mass of loaded article $m_H$ calculated by the formula 2, and estimates the height of center of gravity $h_H$ of the loaded article by a method suitable for the type of the loaded article.

Figure 6:
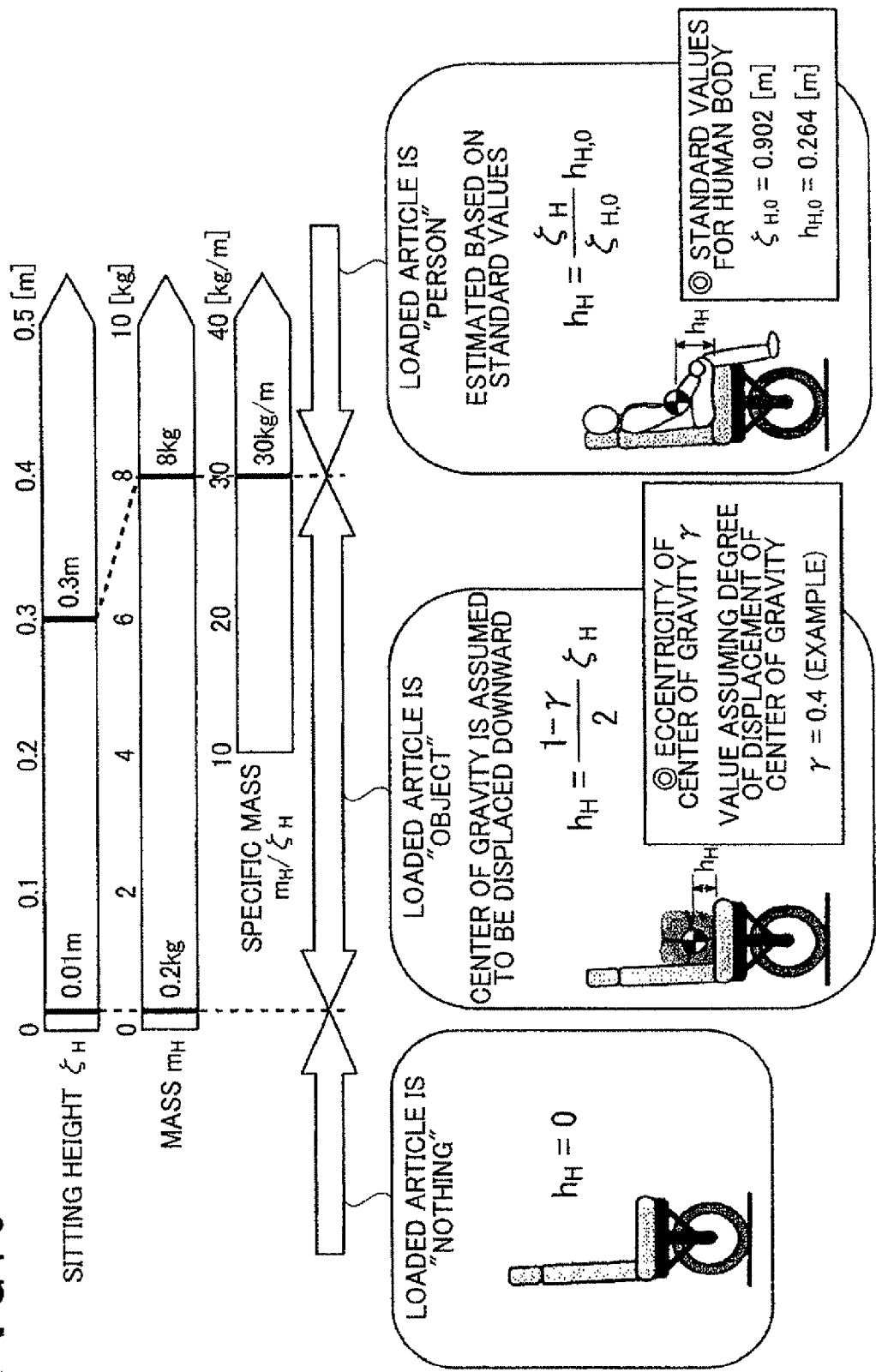
FIG. 6 is an explanatory diagram about type determination of the loaded article and estimation of a height of center of gravity based on the type determination.

FIG. 6 explains the type determination of the loaded article and the determination of the height of center of gravity $h_H$ based on the type.

As shown in FIG. 6, certain threshold values are set for a sitting height $\zeta_H$, the mass $m_H$, and a specific mass $m_H/\zeta_H$, and the type of the loaded article is discriminated based on the threshold values. Note that the threshold values used in FIG. 6 and in the following discriminating formulae are only examples and subjected to modifications depending on the assumed environment of use.

(a) If $m_H < 0.2$ kg and $\zeta_H < 0.01$ m, the loaded article is discriminated as "nothing."
(b) If $m_H > 8$ kg and $\zeta_H > 0.3$ m and furthermore $m_H/\zeta_H > 30$ kg/m, the loaded article is discriminated as "person."

(c) In other cases (in cases of neither (a) nor (b) described above), the loaded article is discriminated as "luggage."

In the determination criterion (b) for determining the "person" among the determination criteria described above, the threshold value for the body weight is set to a small value of 8 kg because it is also assumed that a child is on board. In addition, by adding the specific mass (weight per unit sitting height: $m_H/\zeta_H$) to the determination criterion for person, the accuracy of the determination can be improved.

Note that, in order not to determine small-sized heavy luggage (for example, an iron block) as a person when it is loaded, a condition for an upper limit, that is, $m_H/\zeta_H<p$ (for example, 80 kg/m), may be added to the determination criterion for person.

In addition, each of the determination criteria and determination values are merely examples and subjected to change as appropriate for use in the determination, depending on use conditions assumed.

As described below, the center-of-gravity position estimation system 25 estimates the height of center of gravity (height from the seating face 131) $h_H$ of the loaded article, depending on the type of the loaded article discriminated. In this way, by discriminating the loaded article and changing the estimation method (evaluation formula) for the height of center of gravity $h_H$ depending on the type of the loaded article, more accurate value can be estimated.

(a) If the loaded article is discriminated as "nothing,"

$h_H=0$ (b) If the loaded article is discriminated as "luggage," it is assumed that the center of gravity is displaced to the lower side of the geometric center, and using an eccentricity γ representing the degree of the downward displacement, the height of center of gravity $h_H$ is obtained from the following formula 3. The eccentricity γ is an assumed value set in advance so that γ=0.4 in the present embodiment.

$$h_H=((1-\gamma)/2)\zeta_H \quad \text{(Formula 3)}$$

(c) If the loaded article is discriminated as "person," the height of center of gravity $h_H$ is obtained from formula 4 on the basis of a standard body shape of a person.

In the formula 4, $\zeta_{H,0}$ and $h_{H,0}$ represent standard values of the sitting height and the height of center of gravity, respectively, and are assumed as $\zeta_{H,0}=0.902$ m and $h_{H,0}=0.264$ m, respectively, in the present embodiment.

$$h_H=(\zeta_H/\zeta_{H,0})h_{H,0} \quad \text{(Formula 4)}$$

Note that, here, the description has been made of the case in which the type and the height of center of gravity of the loaded article are obtained according to FIG. 6. However, the type and the height of center of gravity of the loaded article may be obtained by using more complex criteria or evaluation formulae (maps).

Next, the center-of-gravity position estimation system 25 obtains the displacement of center of gravity $\lambda_H$ of the loaded article in the lateral direction, based on the load distribution on the loading portion 13 obtained from the load meter 51 and on the mass of loaded article $m_H$ and the height of center of gravity $h_H$ of the loaded article serving as loaded article information that has been obtained.

In FIG. 5, the equilibrium of horizontal components (components in the direction perpendicular to the plane of symmetry of vehicle body) of forces acting on the loading portion and of moments about the reference axis (line of intersection between the plane of symmetry of vehicle body and the plane of installation of the load meter 51) is expressed by the following formulae 5. However, the centrifugal force and the inertia force caused by an angular velocity and an angular acceleration, respectively, of vehicle body inclining motion (or inclination motion of the loading portion 13) are ignored.

In the formulae 5, $m_c$, $\lambda_c$, $h_c$, and $\eta_c=h_c+\delta_S$ represent the mass, the displacement of center of gravity (distance from vehicle body axis to the center of gravity), the height of center of gravity (distance from the seating surface of the seating face 131 to the center of gravity), and the height of center of gravity relative to the load meter (distance from the plane of installation of the load meter 51 to the center of gravity), respectively, of the whole loading portion, and are expressed by formulae 6.

In addition, in the formulae 5 and 6, $m_H$, $\lambda_H$, $h_H$, and $\eta_H=h_H+\delta_S$ represent the mass, the displacement of center of gravity, the height of center of gravity, and the height of center of gravity relative to the load meter, respectively, of the loaded article; $m_S$, $\lambda_S$, $h_S$, and $\eta_S=h_S+\delta_S$ represent the mass, the displacement of center of gravity, the height of center of gravity, and the height of center of gravity relative to the load meter, respectively, of the seat; $\delta_S$ represents the thickness of the seating face 131 (distance from the plane of installation of the load meter 51 to the seating surface of the seating face 131), and g represents the acceleration of gravity.

In the formulae 5, the symbol "(..)" used in $\lambda_H(..)$ represents a second order derivative.

$$F_t=\Sigma F_t^{(k)}=-m_c a-m_H \lambda_H(..) F_{et}$$

$$T_m=\Sigma(F_n^{(k)}Y^{(k)})=F_n\lambda_c-F_t\eta_c+m_H\lambda_H(..)(\eta_H-\eta_c)-F_{et}(\eta_{et}-\eta_c) \quad \text{(Formulae 5)}$$

$$m_c=m_H+m_S$$

$$\lambda_c=(m_H\lambda_H+m_S\lambda_S)/m_c$$

$$\eta_c=(m_H\eta_H+m_S\eta_S)/m_c \quad \text{(Formulae 6)}$$

In the formulae 5, $F_n^{(k)}$ and $F_t^{(k)}$ are the tensile load and the lateral load (component in the direction perpendicular to the plane of symmetry of vehicle body) measured by the k-th of the N load meters, and the vertical force $F_n$ and the lateral force Ft acting on the loading portion are obtained by summing up the measurements of all of the N load meters. Also, $Y^{(k)}$ is the mounting position (distance from the plane of symmetry of vehicle body) of the k-th load meter, and the moment $T_m$, acting on the loading portion is obtained by summing up the products of $Y^{(k)}$ and $F_n^{(k)}$.

In the formulae 5, a is the lateral acceleration to which the loaded article is actually subjected, and by using these values, the displacement and the height of center of gravity of the loaded article can also be obtained during turning.

The lateral acceleration a used in the formulae 5 is obtained from a measured value of the sensor 40 for running control, In the formulae 5, $F_{et}$ represents an external force, which corresponds to a force produced by being pressed from the outside by a person or a force by a wind. In addition, $\eta_{et}$ represents the height of acting point (height from the plane of installation of the load meter 51) of the external force. These values are unknown. Therefore, the two formulae of the formulae 5 include three unknowns, including the displacement of center of gravity $\lambda_H$ of the loaded article.

Consequently, it is impossible to accurately obtain both of the external force $F_{et}$ and the height of acting point $n_{et}$ thereof. However, if the value of one of the both is assumed, the value of the other can be obtained. For example, if an assumed position of aerodynamic center (acting point of air resistance) is assumed as the height of acting point $\eta_{et}$, the quantity of the air resistance $F_{et}$ can be evaluated, and the evaluated value can also be used for the vehicle running and attitude control.

In the present embodiment, the influence of the external force is assumed to be small, and therefore it is assumed that $F_{et}=0$. Hereby, the two formulae of the formulae 5 can be transformed into formulae 7 shown below. The formulae 7 are algebraic expressions by which the displacement of center of gravity $\lambda_H$ of the loaded article can be evaluated simply and stably.

That is, by using the weight $m_H$ and the height of center of gravity $h_H$ of the loaded article that have been obtained, the center-of-gravity position estimation system 25 obtains the displacement of center of gravity $\lambda_H$ of the loaded article based on the formulae 7 (and formulae 6).

$$\lambda_H = (mc\lambda_c - m_S\lambda_S)/m_H$$

$$\lambda_c = \{F_t + F_{Ha}(\eta_H - \eta_c) + T_m\}/F_n$$

$$F_{Ha} = F_t + m_c a \qquad \text{(Formulae 7)}$$

After estimating the mass mH, the displacement of center of gravity λH, and the height of center of gravity hH that are the mechanical parameters of the loaded article, the turning limit determination system 23 obtains the position of center of gravity of the whole vehicle combined of the vehicle body and the loaded article (such as occupant) (step 14).

Figure 7:
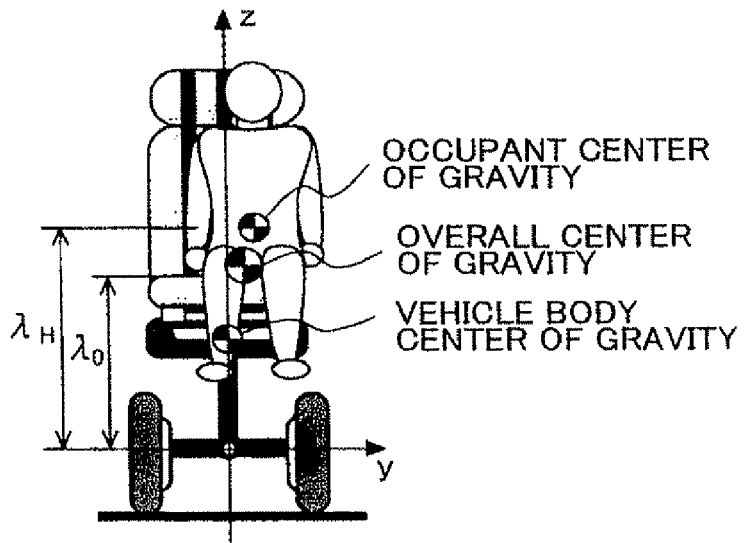
FIG. 7 shows positions of centers of gravity of the vehicle, the occupant, and a whole.

FIG. 7 shows the positions of centers of gravity of the vehicle, the occupant, and the whole.

The turning limit determination system 23 obtains the mass m, the displacement of center of gravity λ, and the distance of center of gravity l of the whole vehicle from the following formulae 8.

In the formulae 8, $m_H$, $\lambda_H$, $h_H$, and $l_H = h_{H+l0}$ represent the mass, the displacement of center of gravity, the height of center of gravity, and the distance of center of gravity, respectively, of the loaded article. The symbol $l_0$ represents the distance from the center of rotation of the vehicle body in the longitudinal direction (axle) to the seating surface of the seating face 131. In addition, $m_{CB}$ and $l_{CB}$ represent the mass and the distance of center of gravity, respectively, of the vehicle body. Note that the displacement of center of gravity of the vehicle body is assumed as $\lambda_{CB}=0$.

$$m = m_H + m_{CB}$$

$$\lambda = m_H \lambda_H / m$$

$$l = (m_H l_H + m_{CB} l_{CB})/m \qquad \text{(Formulae 8)}$$

Next, the turning limit determination system 23 calculates the limit lateral acceleration $a_{lim} = a_{Min}$, $a_{Max}$ from the obtained position of center of gravity of the whole vehicle (mass m, displacement of center of gravity λ, and this distance of center of gravity l) (step 14).

Here, the lateral acceleration is assumed to be positive in the direction during right turn (toward left when looking from vehicle), and negative in the direction during left turn (toward right when looking from vehicle). In general, $a_{Min}$, represents the limit lateral acceleration during left turn, and $a_{Max}$ corresponds to the limit lateral acceleration during right turn.

Figure 8:
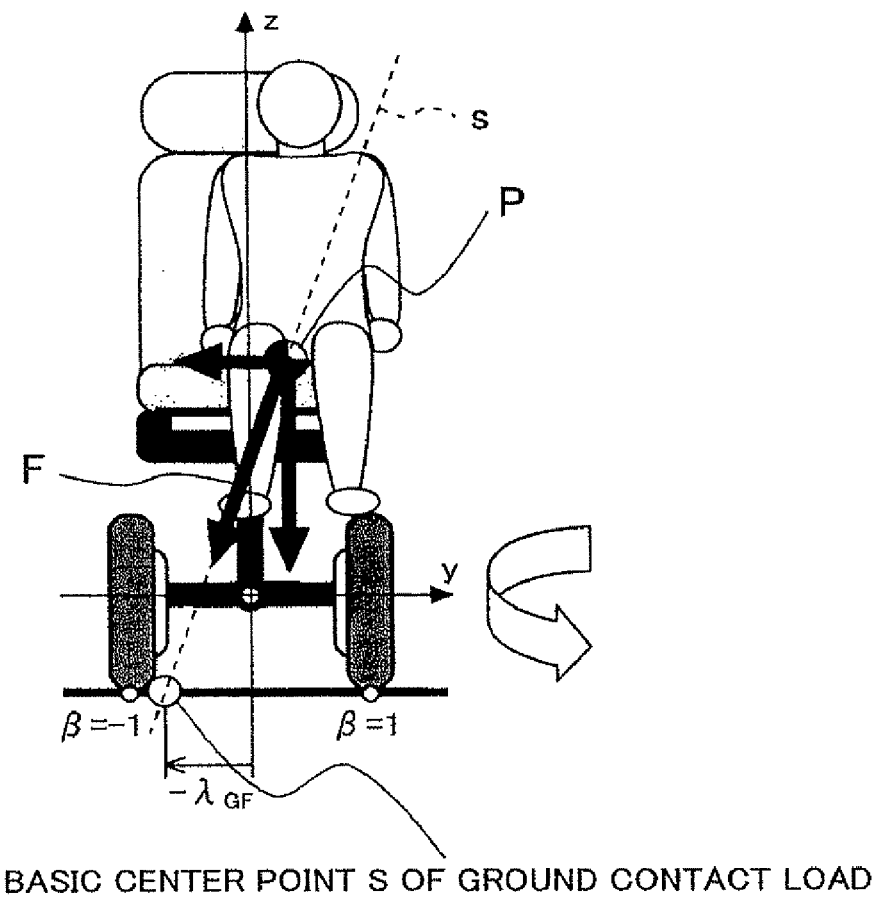
FIG. 8 is an explanatory diagram about a center point S of ground contact load, a center position λGF of ground contact load, and an eccentricity β of ground contact load.

FIG. 8 shows a center point S of ground contact load determined from the lateral acceleration a and the position of center of gravity of whole body, a center position $\lambda_{GF}$ of ground contact load, and an eccentricity β of ground contact load.

As shown in FIG. 8, the center point S of ground contact load is an intersection point between the ground surface and a straight line that is parallel to a resultant force vector F of a centrifugal force and a gravitational force and also passes through the center of gravity. The relative position (displacement) of the point S from the central axis of the vehicle body is represented as the center position $\lambda_{GF}$ of ground contact load.

Moreover, the eccentricity β of ground contact load is a nondimensional value of $\lambda_{GF}$ obtained by using a half tread D/2. If –1<β<1, the center point of ground contact load is located between the both drive wheels 11.

The eccentricity β of ground contact load and the center position $\lambda_{GF}$ of ground contact load are expressed by the following formulae 9.

In the formulae 9, $R_w$ is a tire ground contact radius, D is a tread (distance between both drive wheels 11a and 11b), λ is the displacement of center of gravity of whole vehicle, l is the distance of center of gravity of whole vehicle, a is the current lateral acceleration, and g is the acceleration of gravity.

$$\beta = \lambda_{GF}/(D/2)$$

$$\lambda_{GF} \lambda - (a/g)(l + R_W) \qquad \text{(Formulae 9)}$$

According to the value of the eccentricity β of ground contact load obtained from the formulae 9, the degree of stability of the vehicle can be determined as follows.
(a) β=0 . . . Neutral state: The stablest state
|β|>1 . . . Vehicle body rollover: The vehicle rolls over in the direction in which the load contact point is displaced.
|β|>$\beta_{slip}$ . . . One wheel slip: The drive wheel on the side farther from the load contact point slips. (The vehicle is highly probable to result in spinning and rolling over.)

The degree of load eccentricity $\beta_{slip}$ for start of slip that serves as a threshold value in the condition of one wheel slip (c) is expressed by the following formula 10.

In the formula 10, $a_{BC}$ is a lateral acceleration at the position of center of gravity, g is the acceleration of gravity, $R_w$ is the tire ground contact radius, and m is the mass of the vehicle. In addition, $\tau_{w*}$ represents a drive torque of the drive wheel on the side farther from the center point of ground contact load.

$$\beta_{slip} = 1 - \{1/\sqrt{(1-(a/\mu g)^2)}\}|\tau_{w*}|/\{(1/2)\mu m g R_w\} \qquad \text{(Formula 10)}$$

In the formula 10, μ is a coefficient of friction between the tire and the ground surface. Although an assumed value set in advance is given to the coefficient μ in the present embodiment, a value measured by a measuring device or estimated by an observer may be used.

As is obvious from the formula 10, the value of $\beta_{slip}$ is smaller than 1. That is, if a drive torque is being applied, one wheel slips before the vehicle rolls over. Consequently, this slip limit $\beta_{slip}$ is assumed to be a stability limit in the present embodiment.

Then, the turning limit determination system 23 obtains the limit lateral acceleration $a_{lim} = a_{Max}$, $a_{Max}$ by solving the three formulae 9 and 10.

However, because the simultaneous equations composed of formulae 9 and 10 cannot be solved explicitly, the limit lateral acceleration is determined by using an implicit iterative calculation method such as Newton's method, or a table of numerical solutions obtained in advance by numerical calculation.

The turning limit determination system 23 supplies the limit lateral acceleration $a_{lim} = a_{Min}$, $a_{Max}$ obtained by the method described above to the turning target limiting system 22.

After the limit lateral acceleration $a_{lim}$ has been obtained from the estimated value of the position of center of gravity of the whole vehicle, the turning target control system 22 determines the target running state including limitation of the turning target values (steps 15 to 18).

First, the turning target control system 22 sets the target running state based on the input operation of the occupant (step 15). That is, the turning target control system 22 sets, as the target running state, the target vehicle speed V* and the target curvature γ* corresponding to input values of the running target entered from the controller 31.

Subsequently, the turning target control system 22 obtains the target lateral acceleration a*=γ*V*$^2$ from the target vehicle speed V* and the target curvature γ* that have been set (step 16).

Then, the turning target control system 22 judges whether the target lateral acceleration a* does not exceed the limit lateral acceleration $a_{Min}$, $a_{Max}$ determined in the step 14 ($a_{Min}$<a*<$a_{Max}$?) (step 17).

If the target lateral acceleration a* falls within the range of the limit lateral acceleration $a_{lim}$ (=$a_{Min}$, $a_{Max}$) (step 17:Y), the process shifts to step 19 without limiting the target vehicle speed V* and the target curvature γ* given by the operation of the occupant.

Note that the running target (actual target) is given as V*∼=V*, γ*∼=γ* in this case.

On the other hand, if the target lateral acceleration a* exceeds the limit lateral acceleration $a_{lim}$ (=$a_{Min}$, $a_{Max}$) (step 17: N), the turning target control system 22 limits and modifies the target running state (V*, γ*) (step 18). That is, the turning target control system 22 optimizes the target running state (V*, γ*) by using one of methods (a) to (e) so that the lateral acceleration a*≈the limit lateral acceleration $a_{lim}$ (=$a_{Min}$, $a_{Max}$).

The optimization by one of (a) to (c) is performed with respect to the required target running state (V*, γ*), resulting in an optimization in accordance with the operation (intention) of the occupant.

The optimization by (c) or (e) is performed with respect to the running state and the history thereof in the case that the vehicle runs in the required target running state.

In the optimization by one of (a) to (c), the ideal target running state (V*, γ*) is limited to the actual target running state (V*∼, γ*∼) so that the lateral acceleration a*≈the limit lateral acceleration $a_{lim}$ (=$a_{Min}$, $a_{Max}$).

Hereby, because the turning speed and the turning curvature are not limited more than necessary, it is possible to achieve maximum use of turning performance of the vehicle up to the limit thereof.

In the description below, the ideal target refers to the input target (V*, γ*) of the occupant, and the ideal target state refers to the position, the speed, and so forth after the vehicle has run according to the ideal target.

In addition, the actual target refers to the values (V*∼, γ*∼) obtained by limiting the ideal target so that the target lateral acceleration a* equals to the limit lateral acceleration $a_{lim}$, and the actual target state refers to the position, the speed, and so forth after the vehicle has run according to the actual target.

(a) First Optimization

In the first optimization, optimization is performed with respect to the input target (V*, γ*) of the occupant so that the difference between the ideal target state and the actual target state is minimized.

Figure 9:
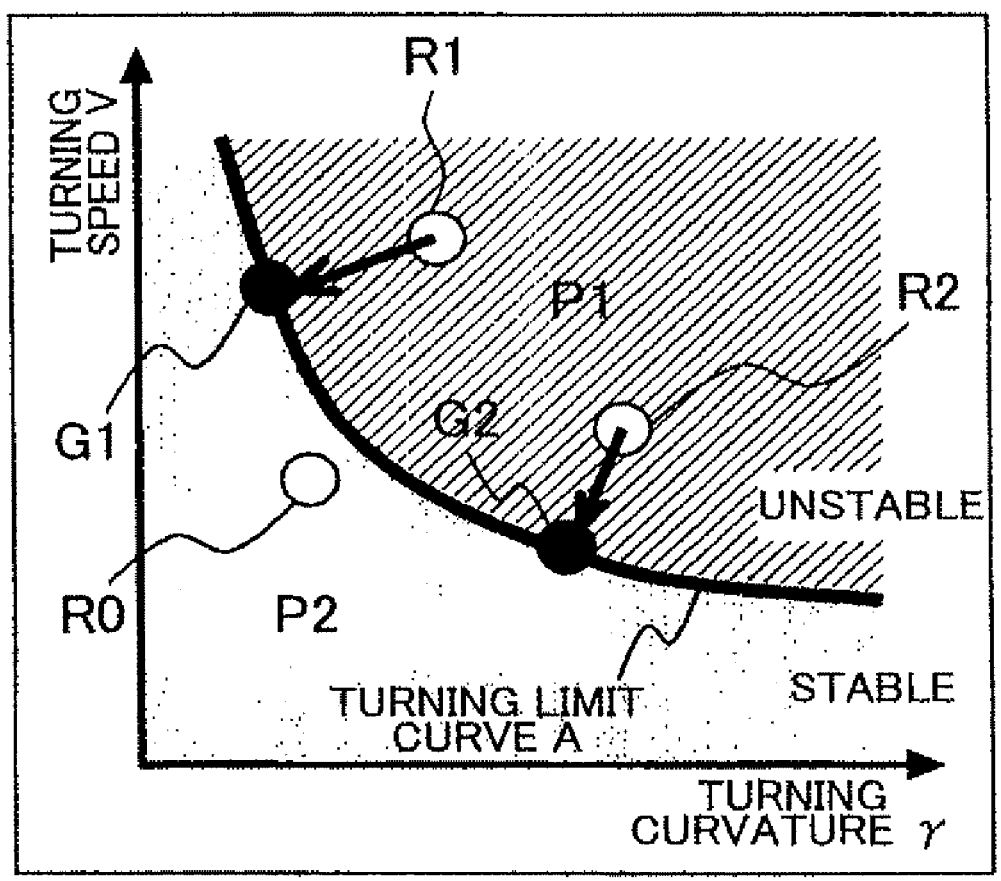
FIG. 9 is an explanatory diagram showing states of a first optimization.

FIG. 9 shows the states of the first optimization.

In FIG. 9 described above, the turning limit curve A is a curve determined by the limit lateral acceleration $a_{lim}$ that has been determined in the step 14. The region on the origin side (lower left side) of this turning limit curve represents a stable state, whereas the region on the side away from the origin (upper right side) represents an unstable region (region in which limitation is required).

As shown in FIG. 9, if the ideal target R0 entered is situated in the stable region (step 17: Y), the optimization is not performed, and the turning control is performed with the ideal target entered.

On the other hand, if the ideal targets R1 and R2 are situated in the unstable region, they are optimized into the actual targets G1 and G2, respectively, situated on the turning limit curve A representing the stable limit of turning.

In this optimization, for example, G1 that represents a state as near as possible to the ideal target R1 is selected on the turning limit curve A.

That is, the turning target control system 22 acquires the ideal target R (V*, γ*) and the turning limit $a_{lim}$, and obtains the actual target G (V*∼, γ*∼) based on the following simultaneous equations (formulae 11).

$$xy^2=c$$

$$2x(x-x_1)=y(y-y_1)$$

$$x=\gamma^*\sim/\gamma_0,\ x_1=\gamma^*/\gamma_0,\ c=a_{lim}/(\gamma_0 V_0^2)$$

$$y=V^*\sim/V_0,\ y_1=V^*/V_0 \quad \text{(Formulae 11)}$$

In the formulae 11, $V_0$ and $\gamma_0$ are reference values of the turning speed and the curvature, respectively, and for example, maximum setting values thereof in the steering system are given to $V_0$ and $\gamma_o$. Note that the weighting factors for the speed and the curvature can be changed by changing the values of $V_0$ and $\gamma_0$.

Newton's method (iterative calculation method), for example, is used as a numerical solution method for the formulae 11. Note that the stability and speed of convergence of the method can be improved by providing the solution obtained in the previous time step as an initial value.

The turning target control system 22 uses a determination method by numerical calculation in the present embodiment. However, another method may be used in which the solutions of the simultaneous equations described above are preliminarily provided in a table as functions of the parameters $x_1$, $y_1$, and c, and the actual target state is determined by using the table.

As described above, the first optimization with respect to the ideal target (V*, γ*) given as input by the occupant is suitable during normal running by operation of the occupant, and capable of achieving a running state in accordance with the intention of the occupant.

In addition, the appropriateness and safety of the running target are guaranteed under the responsibility of the operator.

Moreover, the algorithm is simple, providing high responsiveness and robustness.

(b) Second Optimization

In the second optimization, the temporal change (temporal rate of change) in the ideal target R (V*, γ*) is taken into account to determine the actual target G.

Figure 10A:
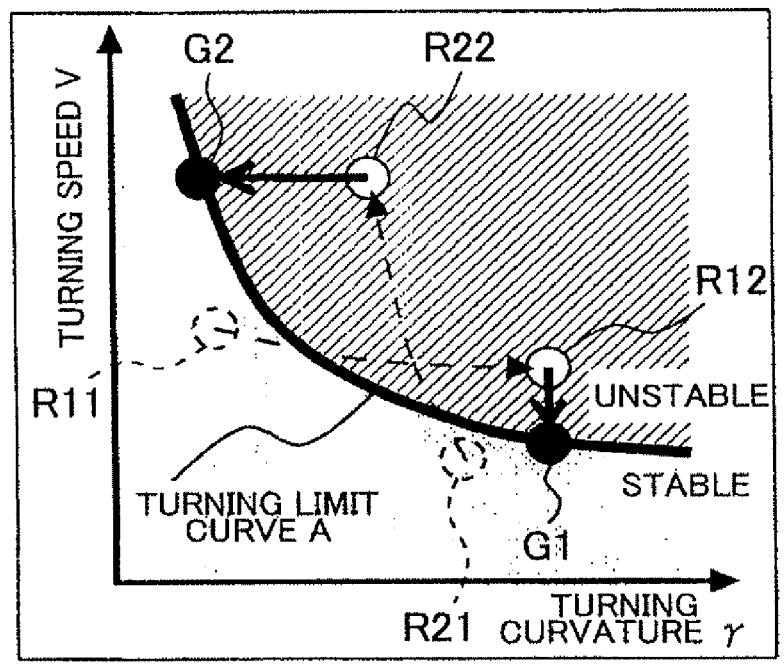
FIG. 10 shows explanatory diagrams illustrating states of a second optimization.

FIG. 10 shows the states of the second optimization.

As shown in FIG. 10, in the second optimization, it is assumed, for example, that the ideal target R11 in the stable region is moved to the ideal target 12 in the unstable region in a certain period of time. In this case, the amount of change in the ideal turning curvature Δγ* is larger than the amount of change in the ideal target vehicle speed ΔV*, which can be judged as an indication of a running intention of the occupant who desires more increase in curvature than in vehicle speed.

Consequently, the turning target control system 22 preferentially limits the element with a smaller amount of change among the both elements V* and γ* of the ideal target after change, without limiting the element with a larger amount of change, thus determining the actual target G on the turning limit curve A.

For example, if the ideal target has changed from R11 to R12 in a predetermined time as described in the example above, the turning target control system 22 judges that the occupant strongly desires an increase in the turning curvature, and therefore limits the vehicle speed V* (V*~=V*'<V*) while maintaining the turning curvature at the entered value γ* (γ*~=γ*).

In addition, if the ideal target has changed from R21 to R22, the turning target control system 22 judges that the occupant strongly desires an increase in the vehicle speed, and therefore limits the turning curvature γ* (γ*~=γ*'<γ*) while maintaining the vehicle speed at the entered value V* (V*~=V*).

Figure 10B:
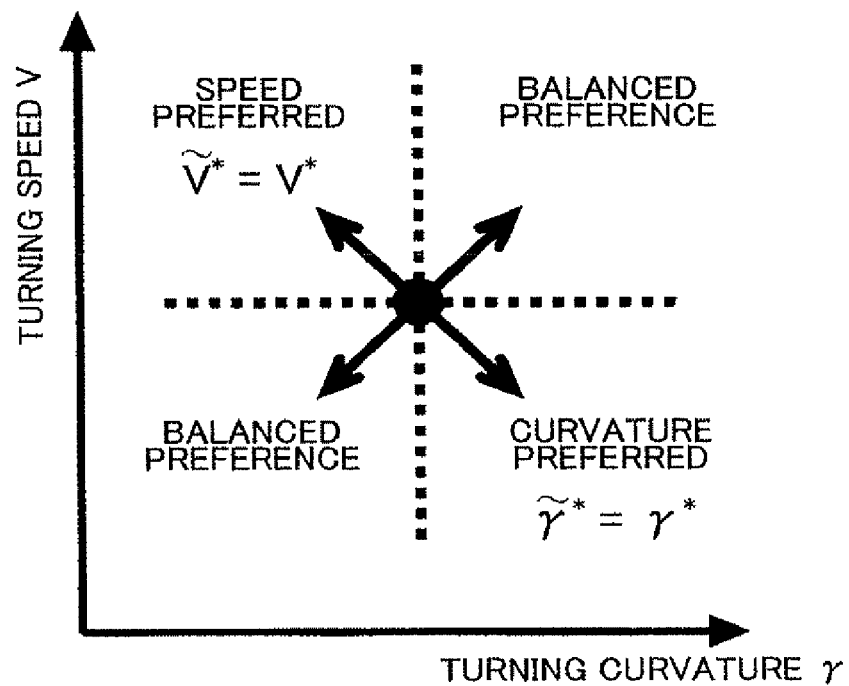

The above description is summarized, as shown in FIG. 10B, that the optimization is performed according to the direction of temporal change in the ideal target state (V*, γ*) by input operation, as described below.

The turning target control system 22 first acquires the ideal targets V*, γ* and the turning limit $a_{lim}$, and then obtains the temporal changes ΔV*, Δγ* in the ideal targets from the following formulae 12.

$$\Delta V^{*(k)} = V^{*(k)} - V^{*(k-n)}$$

$$\Delta \gamma^{*(k)} = \gamma^{*(k)} - \gamma^{*(k-n)} \quad \text{(Formulae 12)}$$

In the formulae 12, the temporal changes are evaluated based on the differences between the current ideal targets $V^{*(k)}, \gamma^{*(k)}$ and the ideal targets $V^{*(k-n)}, \gamma^{*(k-n)}$ before a reference time T=nΔt.

If an amount of change in an ideal target is small in the reference time T, the direction of change is determined by taking the further previous value into account.

Subsequently, the turning target control system 22 limits the ideal targets V*, γ* based on the direction of the temporal change as follows.

(i) In Case of Change in Lower Right Direction (ΔV*≦0 and Δγ*≧0)

For example, it is assumed to be an operation at the entrance of a curve. In this case, judging it to be a request of the occupant "desiring to turn," the turning target control system 22 limits only the target speed, giving priority to the target curvature.

That is, the turning target control system 22 sets the actual target curvature as γ*~=γ*.

In addition, the turning target control system 22 obtains the actual target speed by using the formula V*~=√($a_{lim}$/γ*).

(ii) In Case of Change in Upper Left Direction (ΔV*≦0 and Δγ*≦0)

For example, it is assumed to be an operation at the exit of a curve. Judging it to be a request of the occupant "desiring to accelerate," the turning target control system 22 limits only the target curvature, giving priority to the target speed.

That is, the turning target control system 22 sets the actual target speed as V*~=V*.

In addition, the turning target control system 22 obtains the actual target curvature by using the formula γ*~=$a_{lim}$/V*².

(iii) In Other Cases (of Increase or Reduction in Both Ideal Target Speed and Ideal Target Curvature)

In these cases, the turning target control system 22 limits the target speed and the target curvature depending on the direction (angle) of the change, and obtains the actual target speed V*~(=x) and the actual target curvature γ*~(=y) from the following formulae 13.

Note that in the formulae 13, Δx=Δγ*/γ₀ and Δy=ΔV*/V₀.

$$xy^2 = c$$

$$\Delta x(x - x_1) = \Delta y(y - y_1) \quad \text{(Formulae 13)}$$

In this manner, in the second optimization with respect to the ideal target (V*, γ*) entered by the occupant, the change in the input operation is judged to be a strong running intention of the occupant.

Therefore, it is possible to achieve an appropriate running state, particularly during emergency operation of the occupant (for example, a rapid turning command when avoiding a collision).

Note that in the embodiment described above, the description has been made in the case in which the actual target G is determined depending on the above-described three temporal change states (i), (ii), and (iii) based on the temporal change in the ideal target (V*, γ*). However, the actual target G may be determined depending on two temporal change states by limiting the ideal target (V*, γ*) that has a smaller rate of change.

That is, in the ideal target R (V*, γ*), the element with a smaller temporal rate of change among ΔV* and Δγ* is limited into a value on the turning limit curve A.

(c) Third Optimization

In the third optimization, optimization is performed by taking into account the input target (V*, γ*) of the occupant and the change thereof.

The input target (V*, γ*) of the occupant is given by the joystick (controller 31). If the movement of the joystick is quick, it can be judged as an indication of intention of urgency.

Therefore, the temporal rate of change in the input target (V*, γ*) is obtained, and if the quantity thereof is the predetermined threshold value Th (Thy Thγ) or less, the first optimization (optimization with respect to target values) is performed based on the judgment that there is no urgency.

On the other hand, if the rate of change is more than the threshold value Th, the second optimization (optimization in view of change in input target) is performed based on the judgment that there is an urgency.

In the comparison with the threshold value Th, both of the threshold value Thy for vehicle speed and the threshold value Thγ for curvature are used, and if either of the threshold values is exceeded, it is judged that there is an urgency.

Note that once the second optimization is started, the limitation method according to the second optimization continues to be applied until the input target values fall within the limiting values.

The reason for this is as follows: If the joystick has been moved quickly, the position thereof is assumed to remain unmoved for a while because there is an urgency. In this case, the rate of change becomes zero, causing the optimization to return to the first optimization. To prevent this, the above-described limitation method is used.

(d) Fourth Optimization

In the fourth optimization, optimization is performed from the viewpoint of the running position after the predetermined time.

Figure 11:
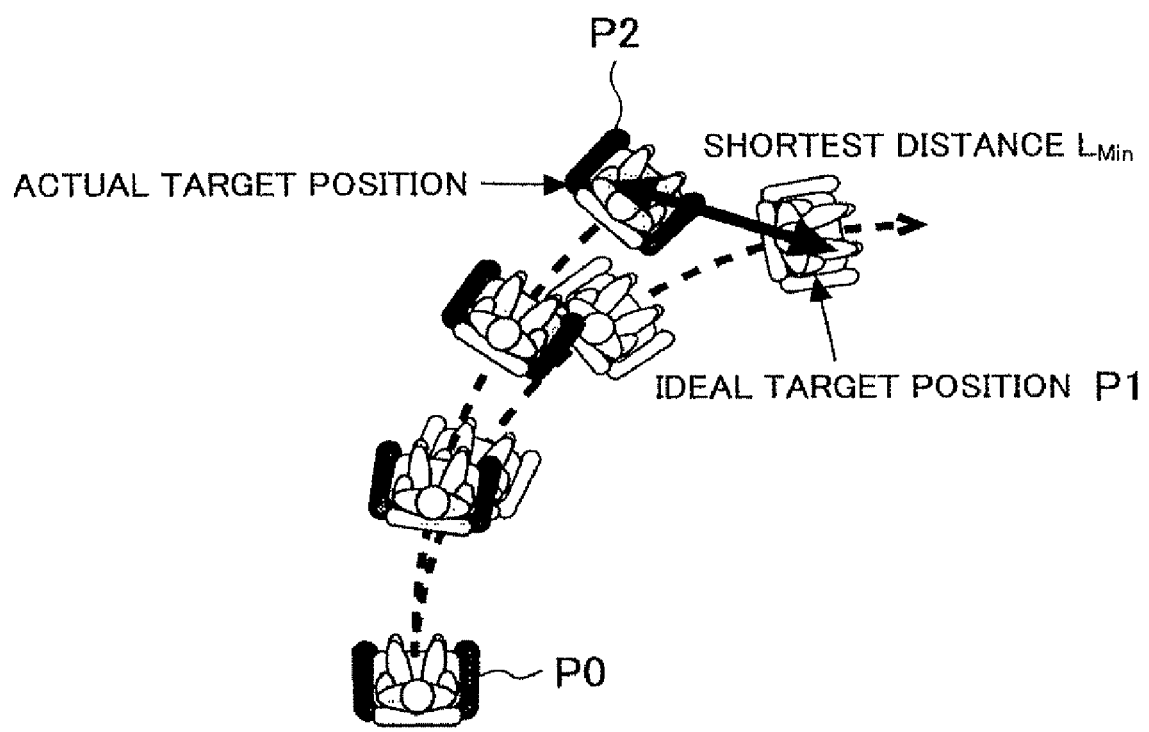
FIG. 11 is an explanatory diagram showing states of a fourth optimization.

FIG. 11 shows the vehicle positions in the case of running in the ideal target state and the vehicle positions according to the fourth optimization.

As shown in FIG. 4 described above, starting from the vehicle position P0 at a certain point of time, the vehicle is assumed to make a turn according to the input target (V*, γ*) of the occupant for the certain predetermined time t until the vehicle position reaches the ideal target position P1. On the other hand, the vehicle is assumed to make a turn according to the actual target ($V^{*}\sim, \gamma^{*}\sim$) obtained by limiting the input target ($V^*, \gamma^*$) for the same time t until the vehicle position reaches the actual target position P2.

In the fourth optimization, the turning target control system 22 acquires the ideal target ($V^*, \gamma^*$) and the turning limit $a_{lim}$, and determines the actual target ($V^{*}\sim, \gamma^{*}\sim$) so that the distance between an ideal target position P1 and an actual target position P2 after the certain time t is minimized.

The conditions (approximate expressions) for minimizing the distance between the both positions P1 and P2 are expressed by the following formulae 14.

$$V^{*}\sim = (\alpha/(1-\beta))V^*, \gamma^{*}\sim = a_{lim}/(V^{*}\sim)^2$$

$$\alpha = a_{lim}/a^*$$

$$\beta = \{2(8-\pi)/(\pi^2 - 2(1+3\alpha)\pi + 32)\}(1-\alpha) \quad \text{(Formulae 14)}$$

In the present embodiment, the certain time t is assumed to be the time required for the vehicle to turn by a predetermined angle $\Theta$=90 degrees in the ideal target ($V^*, \gamma^*$) state.

Note that the predetermined angle $\Theta$ can be set to a smaller angle (for example, 30 degrees or 45 degrees). In that case, finer control is possible.

Moreover, in the present embodiment, the conditions for minimization are obtained as first-order approximations to both P1 and P2 in the formulae 14. However, it is also possible to obtain the exact solutions by implicitly solving the equations.

The fourth optimization described above limits the target so that the actual position of the vehicle is as near as possible to the target position calculated at each moment based on the ideal target. Therefore, if, for example, neighboring vehicles run in a similar manner, the fourth optimization is suitable for running in a convoy (the vehicle is not bumped from behind because not only path but also time is taken into account).

(e) Fifth Optimization

In the fifth optimization, optimization is performed from the viewpoint of running path deviation. The fifth optimization is suitable, for example, for running independently on a designated path.

Figure 12A:
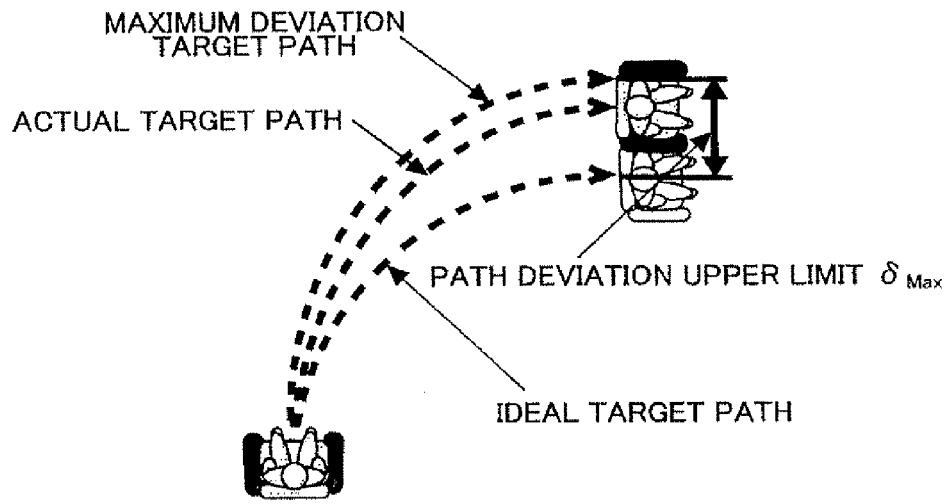
FIG. 12 shows explanatory diagrams illustrating states of a fifth optimization.
Figure 12B:
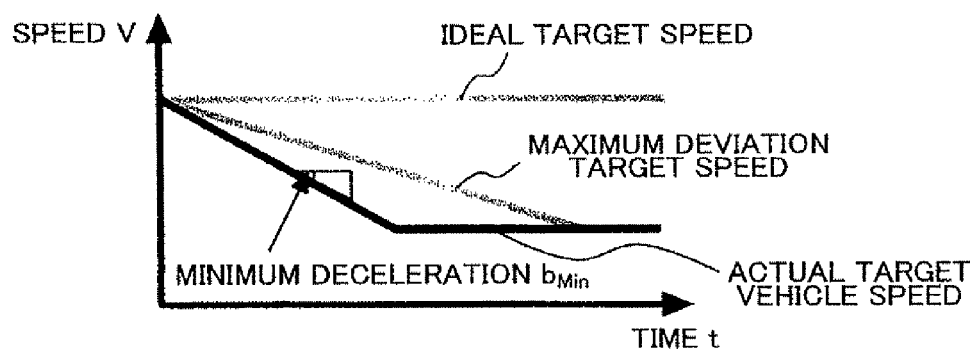
Figure 12C:
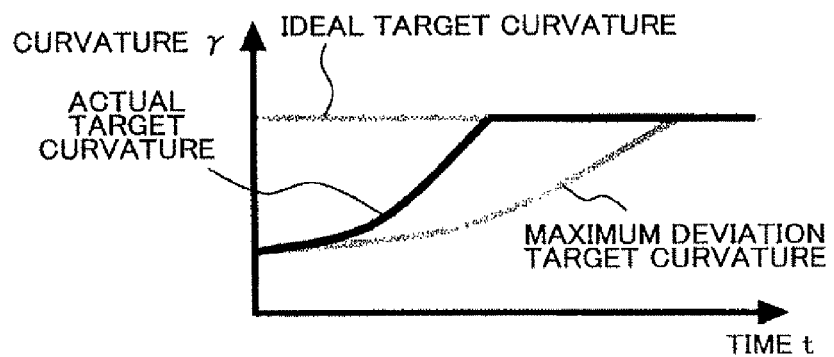

FIG. 12 illustrates the fifth optimization.

As shown in FIG. 12, in the fifth optimization, deceleration is performed so that the deviation between the ideal target path and the actual target path falls within the defined limiting value.

When turning while decelerating at a minimum deceleration $b_{Min}$ (set value) until the turning at the ideal target curvature $\gamma^*$ becomes possible, if the deviation between the both paths is within a path deviation upper limit $\delta_{Max}$, the vehicle is decelerated at the minimum deceleration $b_{Min}$ set in advance.

On the other hand, if the deviation between the both paths is larger than the path deviation upper limit $\delta_{Max}$, the deceleration is set so that the deviation coincides with the path deviation upper limit $\delta_{Max}$.

That is, the turning target control system 22 first acquires the path deviation upper limit $\delta_{Max}$ and the minimum deceleration $b_{Min}$ that have been set in advance, and also acquires the ideal targets $V^*, \gamma^*$ and the turning limit$_{lim}$.

Here, a distance of a vehicle body width is set as the value of the path deviation upper limit $\delta_{Max}$, in the present embodiment. In addition, the minimum deceleration $b_{Min}$ is set to, for example, 0.05 G, but may be configured to be variable.

Then, according to formulae 15, the turning target control system 22 obtains the path deviation $\delta$ produced when turning at the minimum deceleration $b_{Min}$.

$$\delta = (1/\gamma)\{(1-\alpha)/\alpha^2\}(1-\cos\theta)$$

$$\alpha = a_{lim}, \theta = a_{lim}/b_{Min}(1-\sqrt{\alpha}) \quad \text{(Formulae 15)}$$

Subsequently, the turning target control system 22 judges whether the path deviation $\delta$ obtained from the formulae 15 is the path deviation upper limit $\delta_{Max}$ or less, and if so ($\delta \leq \delta_{Max}$), sets the deceleration b to the minimum deceleration $b_{Min}$.

On the other hand, if the path deviation $\delta$ is greater than $\delta_{Max}$ ($\delta > \delta_{Max}$), the turning target control system 22 calculates the deceleration b to make the path deviation $\delta$ coincide with $\delta_{Max}$ from the following formula 16.

$$b\{(1-\sqrt{\alpha})/\cos^{-1}\{1-(\alpha^2/(1-\alpha))\gamma^*\delta\}\}a_{lim} \quad \text{(Formula 16)}$$

Next, the turning target control system 22 calculates the actual target speed $V^{*}\sim$ depending on the obtained deceleration b from formula 17, and also calculates the actual target curvature $\gamma^{*}\sim$ from formula 18.

Note that in the formulae 17 and 18, $\Delta t$ represents a time increment, and the current actual target speed $V^{*}\sim^{(k)}$ is determined from the actual target speed $V^{*}\sim^{(k-1)}$ at the previous time step.

$$V^{*}\sim^{(k)} = V^{*}\sim^{(k-1)} - \Delta t \cdot b \quad \text{(Formula 17)}$$

$$\gamma^{*}\sim^{(k)} = a_{lim}/V^{*}\sim^{(k)2} \quad \text{(Formula 18)}$$

In the fifth optimization described above, unnecessary rapid deceleration can be eliminated by allowing a certain degree of deviation in running path.

In addition, excessive path deviation can be prevented by setting the minimum deceleration $b_{Min}$ as a deceleration small enough not to make the occupant feel uncomfortable.

Note that a constant deceleration is set in the fifth optimization described above. However, in consideration of a jerk (temporal rate of change in acceleration), the optimization may be performed so as to eliminate the frequency components of acceleration change by which the occupant feels uncomfortable.

Moreover, although a preset value is used as the path deviation upper limit $\delta_{Max}$, in the fifth optimization described above, the value of $\delta_{Max}$ may be gradually changed depending on running environment or running situation as follows.

i) Change by Average Running Speed

When an average speed is higher, the road on which the vehicle is running can be assumed to be wider. Therefore, the path deviation upper limit $\delta_{Max}$ is increased (allowable deviation value is increased).

ii) Change Based on Surrounding Object Detection by Sensor

If no object can be detected within a predetermined distance L1 when trying to detect an abject around the vehicle, the path deviation upper limit is set as $\delta_{Max}$=L2 (<L1; for example, L2=L1/2).

iii) Utilization of Navigation Information (Road Width, Traffic, Etc.)

If the vehicle is equipped with a navigation device, navigation information such as road width and traffic is used so as to increase the path deviation upper limit $\delta_{Max}$ with increase in the width of the road on which the vehicle is running and/or with decrease in the traffic.

iv) Set Value Change by Input Operation of Occupant

The set value is made to be changeable to a path deviation upper limit $\delta_{Max}$ desired by the occupant through input operation from an input device such as the operating measure 30.

After the target running state has been determined by the turning target control system 22 as described above, the vehicle body running control system 21 controls the turning (steps 19 and 20).

First, the vehicle body running control system 21 measures the actual running state by using the wheel rotation meters 41 and the accelerometer 42 (step 19).

Figure 13:
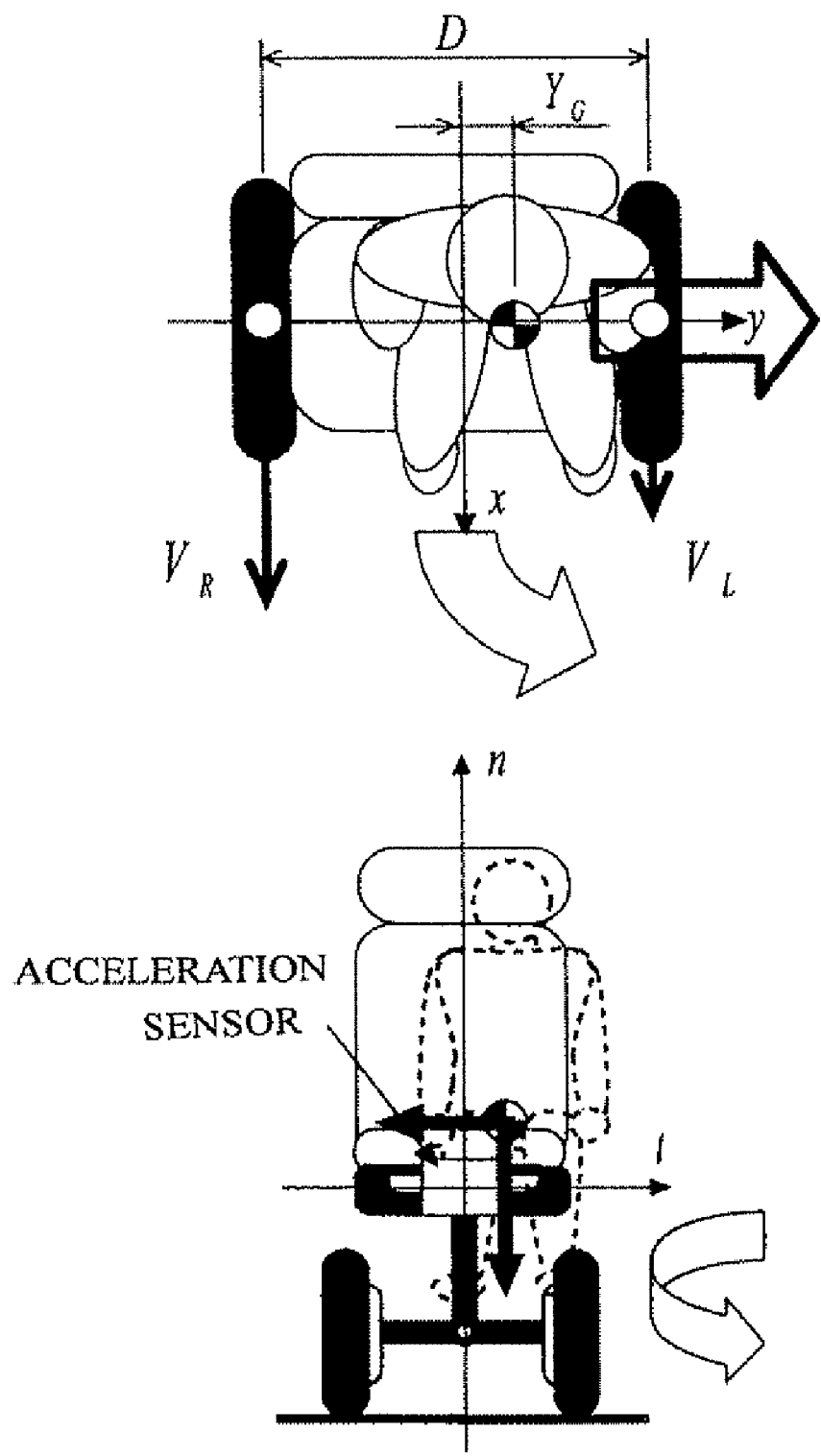
FIG. 13 is an explanatory diagram showing a mechanical state of the vehicle during vehicle turning.

FIG. 13 shows a mechanical state of the vehicle when the vehicle turns.

To measure the lateral acceleration a, there are two methods: (1) a method using measured values of the wheel rotation meters 41 (angle meters) on the wheels (drive wheels 11a and 11b), and (2) a method using a measured value of the accelerometer 42.

(1) Method Using Measured Values of Wheel Rotation Meters 41

This method calculates a lateral acceleration $a^{(1)}$ from the rotational speeds of the right and left drive wheels 11a and 11b.

As shown in FIG. 13A, denoting the rotational circumferential speed of the drive wheel 11a located on the right side looking from the occupant as $V_R$ and the rotational circumferential speed of the drive wheel 11b located on the left side as $V_L$, the lateral acceleration $a^{(1)}$ at the position P of center of gravity of the occupant (loaded article) is calculated from the following formulae 19 and 20.

$$a^{(1)} = V \cdot \Delta V / D \quad \text{(Formula 19)}$$

$$V = V_M - (Y_G/D) \Delta V$$

$$V_M = (1/2)(V_R + V_L)$$

$$\Delta V = V_R - V_L$$

$$V_R = R_W \omega_{WR}$$

$$V_L = R_W \omega_{WL} \quad \text{(Formulae 20)}$$

Note that the symbols used in the formulae 20 are as follows.

$\omega_{WR}$: rotational angular velocity of right wheel
$\omega_{WL}$: rotational angular velocity of left wheel
$R_W$: tire ground contact radius
D: tread
$Y_G$: real displacement of center of gravity (value at previous time step is used)

(2) Method Using a Measured Value of Accelerometer 42

This method calculates a lateral acceleration $a\sim^{(2)}$ from a value of the translational acceleration measured by the accelerometer 42.

As shown in FIG. 13B, denoting the central axis of the vehicle body as n-axis and the axis perpendicular to the plane of symmetry of the vehicle body as t-axis, and defining $a_n$ and $a_t$ as sensor accelerations (components along the respective axes), the lateral acceleration $a\sim^{(2)}$ in the mounting position of the sensor is given as $a\sim^{(2)} = a_t$.

In the present embodiment, the lateral acceleration a is determined from the lateral acceleration $a^{(1)}$ based on the measured values of the wheel rotation meters 41 and the lateral acceleration $a\sim^{(2)}$ based on the measured value of the accelerometer 42.

The vehicle body running control system 21 judges whether the drive wheels are slipping or not, and if no wheel is judged as slipping, determines the value $a^{(1)}$ based on the measured values of the wheel rotation meters 41 as the lateral acceleration a, or if a wheel is judged as slipping, determines the value $a\sim^{(2)}$ based on the measured value of the accelerometer 42 as the lateral acceleration a.

The judgment of drive wheel slip in the present embodiment will be described below.

First, by using the following formula 22, the vehicle body running control system 21 calculates the lateral acceleration $a\sim^{(1)}$ in the mounting position of the sensor from the lateral acceleration $a^{(1)}$ in the position of center of gravity of the occupant obtained based on the measured values of the wheel rotation meters 41.

$$a\sim^{(1)} = a^{(1)} + (\Delta V/D)^2 Y_G \quad \text{(Formula 22)}$$

Then, the vehicle body running control system 21 obtains the value $\Delta a = a\sim^{(1)} - a\sim^{(2)}$, and if the absolute value of $\Delta a$ is a predetermined threshold value $\epsilon$ or more, judges that the slip is occurring.

Note that, by using the following formulae 23, it can be judged which of the right drive wheel 11a and the left drive wheel 11b is slipping.

$a\sim^{(1)} - a\sim^{(2)} \geq \epsilon$ ... Right drive wheel 11a is slipping.

$a\sim^{(1)} - a\sim^{(2)} \leq -\epsilon$ ... Left drive wheel 11b is slipping. (Formulae 23)

Subsequently, the vehicle body running control system 21 approximates the state to the target running state by state feedback control, thereby achieving a stable turning (step 20).

FIG. 14 is a flow chart of the turning stabilization processing (step 20).

The vehicle body running control system 21 acquires the rotational speeds v of the tires and the lateral acceleration a measured in the step 19 (step 21), and calculates the actual turning curvature $\gamma$ ($=a/V^2$) and the turning speed V of the vehicle (step 22).

On the other hand, the vehicle body running control system 21 sets, as the target turning speed and the target turning curvature, the actual target speed $V^*\sim$ and the actual target curvature $\gamma^*\sim$, respectively, that have been determined depending on the limit lateral acceleration $a_{lim}$ based on the input target ($V^*$, $\gamma^*$) of the occupant (step 23).

Note that if $a_{Min} < a^* < a_{Max}$ (step 17: Y), the actual targets are given as $V^*\sim = V^*$ and $\gamma^*\sim = \gamma^*$.

As described above, in the present embodiment, the feedback control is performed by controlling, as direct controlled objects, the actual target speed $V^*$ and the actual target curvature $\gamma^*$ serving as a running target. Therefore, compared with feedforward control by differential torque command (indirect control of speed and curvature by controlling torque as a direct controlled object), the running is stabilized, and the limitation is made easy and sure.

Subsequently, the vehicle body running control system 21 evaluates the differences between the target and the actual values of the turning curvature and the turning speed (step 24), then corrects, by feedback control, the drive torques of the drive wheels 11a and 11b so as to reduce the evaluated differences (step 25), and returns.

By using the following formulae 24, the vehicle body running control system 21 calculates the torque command values for the drive wheels 11a and 11b from the speed target $V^*\sim$ and the curvature target $\gamma^*\sim$ (values after modification relative to limits) determined based on the amount of input operation of the operator, and also from the speed V and the curvature $\gamma$ determined based on the measured values of the sensor 40 for running control.

In the formulae 24, $\tau_R$ and $\tau_L$ represent the torque command values of the right wheel and the left wheel, respectively.

In addition, $\tau\sim$ and $\tau_{dif}$ represent a translation/attitude control torque and a rotation control torque, respectively, expressed in formulae 25. In the formulae 25, the symbol (·) represents a first order derivative.

FIG. 15 shows states of translation control and attitude control during turning. The symbols used in the formulae 24 and 25 are as shown in FIG. 15.

$$\tau_R = (1/2)(\bar{\tau} + \tau_{dif})$$

$$\tau_L = (1/2)(\bar{\tau} - \tau_{dif}) \quad \text{(Formulae 24)}$$

$$\bar{\tau} = K_V(V - V^*) - \underline{K\theta}\theta - \underline{K\theta(\cdot)}\theta(\cdot)$$

$$\tau_{dif} = -K\gamma(\gamma - \gamma^*) \quad \text{(Formulae 25)}$$

In the formulae 25, the first term $-K_V(V-V^*)$ and the second term $-\underline{K\theta}\theta - \underline{K\theta(\cdot)}\theta(\cdot)$ of the right-hand side represent the feedback control of the speed (translation) and the feedback control of the attitude, respectively.

In the formulae 24 and 25, the feedback gains $K_V$, $K\theta$, $K\theta(\cdot)$, and $K\gamma$ are already set, for example, by using pole placement method. Depending on the case, differential gains (also for other variables than attitude angle) or integral gains may be introduced.

In the embodiment described above, the description has been made of an example of the turning control in a single-axle two-wheeled vehicle. However, in the present invention, the methods of the turning control in the present embodiment, including the optimizations with respect to input (request) causing an exceeding of the limit lateral acceleration, can be applied to a vehicle having three or more wheels.

In the vehicle of the embodiment described above, the position of center of gravity of the whole vehicle is estimated, and the limit lateral acceleration $a_{lim}$ ($=a_{Min}$, $a_{Max}$) depending on the position of center of gravity is obtained. Then, the vehicle turns within the limit in which the lateral acceleration $a^*$ obtained from the target running state ($V^*$, $\gamma^*$) requested by the occupant does not exceed the limit lateral acceleration $a_{lim}$.

That is, if a target running state ($V^*$, $\gamma^*$) that does not exceed the limit lateral acceleration $a_{lim}$, has been given (requested) by the occupant, the vehicle turns in the given target running state.

On the other hand, if a target running state ($V^*$, $\gamma^*$) exceeding the limit lateral acceleration $a_{lim}$ has been given, the target running state ($V^*$, $\gamma^*$) is limited to the actual running state ($V^*\sim$, $\gamma^*\sim$) by the optimization shown in (a) to (e) so that the lateral acceleration $a$ equals to the limit lateral acceleration $a_{lim}$ ($=a_{Min}$, $a_{Max}$).

Hereby, because the turning speed and the turning curvature are not limited more than necessary, it is possible to achieve maximum use of turning performance of the vehicle up to the limit thereof.

Note that in the embodiment described, the description has been made of the case in which the target running state ($V^*$, $\gamma^*$) is limited to the actual running state ($V^*\sim$, $\gamma^*\sim$) so that the lateral acceleration $a$ equals to the limit lateral acceleration $a_{lim}$. However, the lateral acceleration $a$ is only necessary to be within the range of the limit lateral acceleration $a_{lim}$.

However, in order to have a wider range of use of vehicle turning performance than conventionally obtained, the lateral acceleration after limitation is given a predetermined threshold value $a_k$ (for example, $a_k = a_{lim} - 0.05$ G) or more.

In addition, in the embodiment described above, the joystick is provided as the controller 31, in which the quantity of longitudinal inclination and the quantity of lateral inclination thereof correspond to the target speed and the target curvature, respectively. However, they may correspond to other state quantities. For example, the quantity of longitudinal inclination may correspond to a target longitudinal acceleration, and the quantity of lateral inclination may correspond to a target turning angular velocity. In this case, it is only necessary to convert the targeted longitudinal acceleration and angular velocity to the speed and the curvature when setting the target running state (step 15 in FIG. 4). Alternatively, similar processing to that of the above-described embodiment may be performed by using the acceleration and the angular velocity as the target running state.

The invention claimed is:

1. A vehicle including two drive wheels arranged facing each other, the vehicle comprising:
   target running state acquiring means for acquiring a target speed $V^*$ and a target curvature $\gamma^*$;
   running control means for controlling running with the target speed $V^*$ and the target curvature $\gamma^*$ that have been acquired;
   center-of-gravity position acquiring means for acquiring a position of center of gravity of the vehicle including a loaded article;
   limit lateral acceleration determination means for determining a limit lateral acceleration alim corresponding to the position of center of gravity acquired; and
   limiting means for limiting at least one of the target speed $V^*$ and the target curvature $\gamma^*$ that have been acquired so that a target lateral acceleration a* corresponding to the target speed $V^*$ and the target curvature $\gamma^*$ that have been acquired is made equal to or less than the limit lateral acceleration alim, in the case that the target lateral acceleration a* exceeds the limit lateral acceleration alim.

2. The vehicle according to claim 1, wherein:
   the limiting means performs the limitation to values that have the smallest differences from the target speed $V^*$ and the target curvature $\gamma^*$ that have been acquired.

3. The vehicle according to claim 2, wherein:
   the limiting means performs the limitation to values that have the smallest differences from the target speed $V^*$ and the target curvature $\gamma^*$ that have been acquired in the case that both of temporal rates of change in the target speed $V^*$ and the target curvature $\gamma^*$ that have been acquired are predetermined threshold values or less, or
   limits at least one having a smaller temporal rate of change than the other of the acquired target speed $V^*$ and the acquired target curvature $\gamma^*$, responsive to a determination that at least one of the temporal rates of change in the target speed $V^*$ and the target curvature $\gamma^*$ that have been acquired is more than the predetermined threshold value.

4. The vehicle according to claim 3, wherein:
   the limiting means limits at least one of the target speed $V^*$ and the target curvature $\gamma^*$ that have been acquired so that the target lateral acceleration a* is equal to the limit lateral acceleration alim.

5. The vehicle according to claim 4, further comprising:
   a load sensor installed at a loading portion;
   a height sensor that measures a height of a weight body; and
   loaded article center-of-gravity acquiring means that acquires a position of center of gravity of the loaded article based on detection values of the load sensor and the height sensor, wherein
   the center-of-gravity position acquiring means acquires the position of center of gravity of the vehicle including the loaded article based on the position of center of gravity of the loaded article acquired and a predefined position of center of gravity of the vehicle.

6. The vehicle according to claim 5, wherein:
the running control means controls running by feedback control by controlling the target speed V* and the target curvature γ* as direct controlled objects.

7. The vehicle according to claim 4, wherein:
the running control means controls running by feedback control by controlling the target speed V* and the target curvature γ* as direct controlled objects.

8. The vehicle according to claim 3, further comprising:
a load sensor installed at a loading portion;
a height sensor that measures a height of a weight body; and
loaded article center-of-gravity acquiring means that acquires a position of center of gravity of the loaded article based on detection values of the load sensor and the height sensor, wherein
the center-of-gravity position acquiring means acquires the position of center of gravity of the vehicle including the loaded article based on the position of center of gravity of the loaded article acquired and a predefined position of center of gravity of the vehicle.

9. The vehicle according to claim 3, wherein:
the running control means controls running by feedback control by controlling the target speed V* and the target curvature γ* as direct controlled objects.

10. The vehicle according to claim 2, wherein:
the limiting means limits at least one of the target speed V* and the target curvature γ* that have been acquired so that the target lateral acceleration a* is equal to the limit lateral acceleration alim.

11. The vehicle according to claim 10, further comprising:
a load sensor installed at a loading portion;
a height sensor that measures a height of a weight body; and
loaded article center-of-gravity acquiring means that acquires a position of center of gravity of the loaded article based on detection values of the load sensor and the height sensor, wherein
the center-of-gravity position acquiring means acquires the position of center of gravity of the vehicle including the loaded article based on the position of center of gravity of the loaded article acquired and a predefined position of center of gravity of the vehicle.

12. The vehicle according to claim 2, further comprising:
a load sensor installed at a loading portion;
a height sensor that measures a height of a weight body; and
loaded article center-of-gravity acquiring means that acquires a position of center of gravity of the loaded article based on detection values of the load sensor and the height sensor, wherein
the center-of-gravity position acquiring means acquires the position of center of gravity of the vehicle including the loaded article based on the position of center of gravity of the loaded article acquired and a predefined position of center of gravity of the vehicle.

13. The vehicle according to claim 2, wherein:
the running control means controls running by feedback control by controlling the target speed V* and the target curvature γ* as direct controlled objects.

14. The vehicle according to claim 1, wherein:
the limiting means performs the limitation to values that have the smallest differences from the target speed V* and the target curvature γ* that have been acquired in the case that both of temporal rates of change in the target speed V* and the target curvature γ* that have been acquired are predetermined threshold values or less, or
limits at least one having a smaller temporal rate of change than the other of the acquired target speed V* and the acquired target curvature γ*, responsive to a determination that at least one of the temporal rates of change in the target speed V* and the target curvature γ* that have been acquired is more than the predetermined threshold value.

15. The vehicle according to claim 14, wherein:
the limiting means limits at least one of the target speed V* and the target curvature γ* that have been acquired so that the target lateral acceleration a* is equal to the limit lateral acceleration alim.

16. The vehicle according to claim 1, wherein:
the limiting means limits at least one of the target speed V* and the target curvature γ* that have been acquired so that the target lateral acceleration a* is equal to the limit lateral acceleration alim.

17. The vehicle according to claim 1, further comprising:
a load sensor installed at a loading portion;
a height sensor that measures a height of a weight body; and
loaded article center-of-gravity acquiring means that acquires a position of center of gravity of the loaded article based on detection values of the load sensor and the height sensor, wherein
the center-of-gravity position acquiring means acquires the position of center of gravity of the vehicle including the loaded article based on the position of center of gravity of the loaded article acquired and a predefined position of center of gravity of the vehicle.

18. The vehicle according to claim 1, wherein:
the running control means controls running by feedback control by controlling the target speed V* and the target curvature γ* as direct controlled objects.

* * * * *